(12) United States Patent
Xiao et al.

(10) Patent No.: US 12,120,450 B2
(45) Date of Patent: Oct. 15, 2024

(54) PHOTOGRAPHING METHOD AND ELECTRONIC DEVICE

(71) Applicant: HUAWEI TECHNOLOGIES CO., LTD., Guangdong (CN)

(72) Inventors: Bin Xiao, Shenzhen (CN); Huanwen Peng, Shenzhen (CN); Nan Song, Shenzhen (CN); Yuanwen Liu, Tampere (FI); Yihua Zeng, Shenzhen (CN); Congchao Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 17/780,586

(22) PCT Filed: Nov. 27, 2020

(86) PCT No.: PCT/CN2020/132416
§ 371 (c)(1),
(2) Date: May 27, 2022

(87) PCT Pub. No.: WO2021/104485
PCT Pub. Date: Jun. 3, 2021

(65) Prior Publication Data
US 2023/0276014 A1    Aug. 31, 2023

(30) Foreign Application Priority Data

Nov. 30, 2019   (CN) .......................... 201911208990.7
Jan. 17, 2020   (CN) .......................... 202010055550.9

(51) Int. Cl.
H04N 5/262    (2006.01)
H04N 5/272    (2006.01)
(Continued)

(52) U.S. Cl.
CPC ........... *H04N 5/2621* (2013.01); *H04N 5/272* (2013.01); *H04N 5/91* (2013.01); *H04N 23/631* (2023.01); *H04N 23/667* (2023.01)

(58) Field of Classification Search
CPC ........ H04N 5/2621; H04N 5/272; H04N 5/91; H04N 23/631; H04N 23/667; H04N 23/62; H04N 5/265; H04N 23/635; H04N 23/80
See application file for complete search history.

(56) References Cited

U.S. PATENT DOCUMENTS

2013/0343727 A1   12/2013   Rav-Acha et al.
2014/0132789 A1*  5/2014    Koyama ................... G06T 7/11
                                                        348/218.1
(Continued)

FOREIGN PATENT DOCUMENTS

CN    103813106 A    5/2014
CN    105516610 A    4/2016
(Continued)

OTHER PUBLICATIONS

ZHANG Yu-hui et al., Method for moving foreground detection based on image fusion, Modern Electronics Technique, Dec. 2013, vol. 36 No. 24, 3 pages.
(Continued)

*Primary Examiner* — Yogesh K Aggarwal

(57) ABSTRACT

A photographing method includes: starting a camera in response to a first operation; entering a first video recording mode in response to a second operation; capturing first video frames in response to a third operation; and stopping capturing the first video frames in response to a fourth operation, to obtain a target video. The $i^{th}$ second video frame in the target video is obtained by fusing a foreground image of the $k^{th}$ first video frame captured by the camera and a background image of the $j^{th}$ first video frame captured by the
(Continued)

camera, and the $(i+1)^{th}$ second video frame in the target video is obtained by fusing a foreground image of the $(k+m)^{th}$ first video frame captured by the camera and a background image of the $(j+n)^{th}$ first video frame captured by the camera, where m≠n. In this way, the electronic device can record a video with a special effect.

16 Claims, 28 Drawing Sheets

(51) Int. Cl.
  *H04N 5/91* (2006.01)
  *H04N 23/63* (2023.01)
  *H04N 23/667* (2023.01)

(56) References Cited

U.S. PATENT DOCUMENTS

| | | |
|---|---|---|
| 2017/0094192 A1 | 3/2017 | Adsumilli et al. |
| 2018/0232861 A1 | 8/2018 | Hamauzu |
| 2018/0278737 A1 | 9/2018 | Posa |

FOREIGN PATENT DOCUMENTS

| | | |
|---|---|---|
| CN | 106851128 A | 6/2017 |
| CN | 107767430 A | 3/2018 |
| CN | 107948543 A | 4/2018 |
| CN | 108566521 A | 9/2018 |
| CN | 109194865 A | 1/2019 |
| CN | 110086985 A | 8/2019 |

OTHER PUBLICATIONS

ITU-T H.264 (Jun. 2019), Series H: Audiovisual and Multimedia Systems, Infrastructure of audiovisual services-Coding of moving video, Advanced video coding for generic audiovisual services, total 836 pages.
Office Action issued in CN202010055550.9, dated Oct. 27, 2021, 5 pages.
International Search Report and Written Opinion issued in PCT/CN2020/132416, dated Feb. 22, 2021, 10 pages.
Rav-Acha A. et al: Making a Long VideoShort: Dynamic Video Synopsis 2017 IEEE Conference on Computer Visionand Pattern Recognition (CVPR) vol. 1, 17, Tune 2006 (Jun. 17, 2006), pp. 435-441 XP055784199.
Extended European Search Report issued in EP20893485.1, dated Nov. 25, 2022, 8 pages.

\* cited by examiner

TO

TO

CONT.
FROM

TO

PHOTOGRAPHING METHOD AND ELECTRONIC DEVICE

CROSS-REFERENCE TO RELATED APPLICATIONS

This application is a national stage of International Application No. PCT/CN2020/132416, filed on Nov. 27, 2020, which claims priority to Chinese Patent Application No. 201911208990.7, filed on Nov. 30, 2019 and 202010055550.9, filed on Jan. 17, 2020. All of the aforementioned applications are hereby incorporated by reference in their entireties.

TECHNICAL FIELD

This application relates to the field of terminal technologies, and in particular, to a photographing method and an electronic device.

BACKGROUND

Currently, electronic devices such as a mobile phone and a tablet computer can provide photographing and video recording functions for a user. Usually, an electronic device supports a plurality of photographing modes, for example, a wide aperture mode, a night mode, and a portrait mode, so that the user can use the electronic device to take photos with different visual effects. However, a video recording mode supported by the existing electronic device is monotonous, and a video with a special effect cannot be recorded.

SUMMARY

A photographing method and an electronic device are provided in embodiments of this application, so that an electronic device can record a video with a special effect. This can make video recording more interesting and improve user experience.

According to a first aspect, an embodiment of this application provides a photographing method, applied to an electronic device having a display and a camera. The method includes: starting the camera in response to a first operation input by a user; entering a first video recording mode of the camera in response to a second operation input by the user; capturing, by the camera in response to a third operation input by the user, first video frames; and stopping, by the camera in response to a fourth operation input by the user, capturing the first video frames, to obtain a target video.

The target video includes M second video frames. The $i^{th}$ second video frame in the M second video frames is obtained by fusing a foreground image of the $k^{th}$ first video frame captured by the camera and a background image of the $j^{th}$ first video frame captured by the camera, and the $(i+1)^{th}$ second video frame in the M second video frames is obtained by fusing a foreground image of the $(k+m)^{th}$ first video frame captured by the camera and a background image of the $(j+n)^{th}$ first video frame captured by the camera, where $M>1$, $m\geq 1$, $n\geq 1$, $m\neq 1$, and i, j, k, m, n, and M are positive integers.

In this embodiment, the $i^{th}$ second video frame in the target video is obtained by fusing the foreground image of the $k^{th}$ first video frame captured by the camera and the background image of the $j^{th}$ first video frame captured by the camera, and the $(i+1)^{th}$ second video frame in the target video is obtained by fusing the foreground image of the $(k+m)^{th}$ first video frame captured by the camera and the background image of the $(j+n)^{th}$ first video frame captured by the camera. Therefore, a quantity of first video frames between background images or foreground images of two contiguous second video frames in the target video is different. This makes video recording more interesting and improves user experience.

For example, k=i, or j=i. In addition, k and j may not be i. This is not limited herein. For example, when k=i, i≠j, and m<n, by using the foregoing solution, a moving speed of a person or an object in a background image in the target video is accelerated relative to that of a person or an object in a foreground image. An effect presented to the user is moving speed acceleration. For another example, when j=i, k≠i, and m>n, by using the foregoing solution, the moving speed of the person or the object in the background image in the target video is accelerated relative to that of the person or the object in the foreground image. An effect presented to the user is moving speed acceleration.

In an example embodiment, a dialog box is displayed on the display in response to the second operation input by the user. The dialog box is used to prompt the user to select a photographed target from the first video frames captured by the camera, and the photographed target is an object presented in the foreground image. This helps the electronic device segment foreground images and background images of the first video frames.

In an example embodiment, the camera is a dual-camera or a time of flight (TOF) camera. This technical solution helps the electronic device obtain depth information of the video frames captured by the camera, so that the electronic device can perform, with reference to the depth information of the video frames, image segmentation on the video frames captured by the camera. This improves accuracy of obtained foreground images and background images.

According to a second aspect, an embodiment of this application provides another photographing method, applied to an electronic device having a display and a camera. The method includes: starting the camera in response to a first operation input by a user; entering a first video recording mode of the camera in response to a second operation input by the user; capturing, by the camera in response to a third operation input by the user, first video frames; and stopping, by the camera in response to a fourth operation input by the user, capturing the first video frames, to obtain a target video.

The target video includes M second video frames. A background image of the $i^{th}$ second video frame in the M second video frames is obtained by superimposing background images of the $i^{th}$ first video frame captured by the camera and r first video frames before the $i^{th}$ first video frame, and a foreground image of the $i^{th}$ second video frame is a foreground image of the $i^{th}$ first video frame captured by the camera, where $i>1$, and i and r are positive integers.

In this embodiment, the background image of the $i^{th}$ video frame in the target video is obtained by superimposing the background images of the $i^{th}$ first video frame captured by the camera and the r first video frames before the $i^{th}$ first video frame, and the foreground image of the $i^{th}$ second video frame is the foreground image of the $i^{th}$ first video frame captured by the camera. In this way, the electronic device can record a video with a visual effect of background ghosting. This makes video recording more interesting and improves user experience.

In an example embodiment, a background image of the $(i+1)^{th}$ second video frame in the M second video frames is obtained by superimposing background images of the $(i+1)^{th}$ first video frame captured by the camera and t first video frames before the $(i+1)^{th}$ first video frame, and a foreground image of the $(i+1)^{th}$ second video frame is a foreground image of the $(i+1)^{th}$ first video frame captured by the camera, where t≠r, and t is a positive integer. This improves a ghosting visual effect presented by the target video to the user. For example, r and t may be determined based on moving speeds of people or objects in the background image and the foreground image.

In an example embodiment, the $i^{th}$ second video frame is displayed on the display when the camera captures the $i^{th}$ first video frame. In this way, the user can preview the video during photographing, which makes video recording more interesting for the user.

In an example embodiment, a dialog box is displayed on the display in response to the second operation input by the user. The dialog box is used to prompt the user to select a photographed target from the first video frames captured by the camera, and the photographed target is an object presented in the foreground image. This helps the electronic device segment foreground images and background images of the first video frames.

In an example embodiment, the camera is a dual-camera or a TOF camera. This technical solution helps the electronic device obtain depth information of the video frames captured by the camera, so that the electronic device can perform, with reference to the depth information of the video frames, image segmentation on the video frames captured by the camera. This improves accuracy of the obtained foreground images and background images.

According to a third aspect, an embodiment of this application provides an electronic device, including a display, a camera, one or more processors, a memory, and one or more computer programs. The one or more computer programs are stored in the memory. When the computer program is executed by the electronic device, the method according to any one of the foregoing aspects and the possible designs provided in the foregoing aspects in embodiments of this application is implemented.

According to a fourth aspect, an embodiment of this application provides an electronic device, including a functional module for implementing the method according to any one of the foregoing aspects and the possible designs provided in the foregoing aspects.

According to a fifth aspect, an embodiment of this application provides a chip. The chip is coupled to a memory in an electronic device, so that when operating, the chip invokes a computer program stored in the memory, to implement the method according to any one of the foregoing aspects or the possible designs of the foregoing aspects in embodiments of this application.

According to a sixth aspect, an embodiment of this application provides a computer-readable storage medium. The computer-readable storage medium stores a computer program, and when the computer program is run on an electronic device, the electronic device is enabled to implement the method according to any one of the foregoing aspects or the possible designs of the foregoing aspects.

According to a seventh aspect, an embodiment of this application provides a computer program product. When the computer program product is run on an electronic device, the electronic device is enabled to implement the method according to any one of the foregoing aspects or the possible designs of the foregoing aspects.

In addition, for technical effects of any design in the third aspect to the sixth aspect, reference can be made to technical effects of different designs in the first aspect and the second aspect, and details are not described herein again.

DESCRIPTION OF EMBODIMENTS

It should be understood that, unless otherwise stated in this application, "/" means or. For example, A/B may represent A or B. The term "and/or" is merely an association relationship for describing associated objects, and indicates that three relationships may exist. For example, A and/or B may represent the following cases: Only A exists, both A and B exist, and only B exists. In addition, in this application, "a plurality of" means two or more. For example, at least one of a, b, or c may represent seven cases: a, b, c, a and b, a and c, b and c, or a, b and c.

In the present disclosure, the term "example", "in some embodiments", "in some other embodiments", or the like is used to represent giving an example, an illustration, or a description. Any embodiment or design scheme described as "example" in this application should not be explained as being more preferred or having more advantages than another embodiment or design scheme. Specifically, the word "example" is used to present a concept in a specific manner.

It should be noted that, in the present disclosure, the terms "first", "second", and the like are only used for a purpose of distinguishing for description, but should not be understood as an indication or implication of relative importance or an indication or implication of a sequence.

This application provides a photographing method. According to this method, an electronic device is enabled to record a video with a special effect based on technologies of frame extraction, image segmentation, and image fusion. This makes video recording by using the electronic device more interesting and improves user experience.

It should be understood that the photographing method provided in this application can be applied to an electronic device. For example, the electronic device may be a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), or the like. A specific type of the electronic device is not limited in embodiments of this application.

Figure 1:
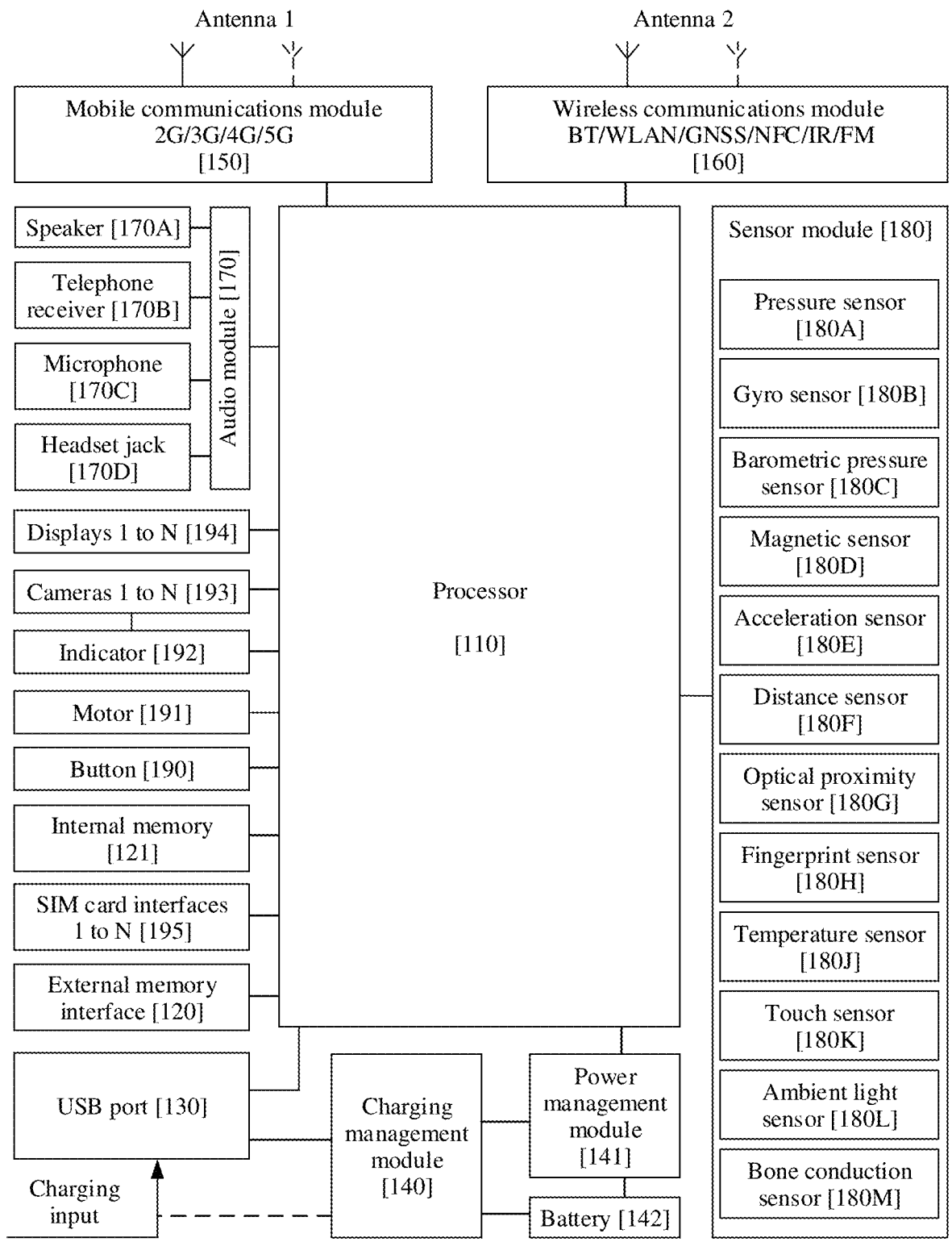
FIG. 1 is a schematic diagram of a structure of an electronic device according to an embodiment of this application.

For example, FIG. 1 is a schematic diagram of a structure of an electronic device according to an embodiment of this application. As shown in FIG. 1, the electronic device may include a processor 110, an external memory interface 120, an internal memory 121, a universal serial bus (USB) port 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device. In some other embodiments of this application, the electronic device may include more or fewer components than those shown in the figure, or some components may be combined, or some components may be split, or there may be a different component arrangement. The components shown in the figure may be implemented by using hardware, software, or a combination of software and hardware.

The processor 110 may include one or more processing units. For example, the processor 110 may include an application processor (AP), a modem, a graphics processing unit (GPU), an image signal processor (ISP), a controller, a video codec, a digital signal processor (DSP), a baseband processor, and/or a neural-network processing unit (NPU). Different processing units may be independent components, or two or more different processing units may be integrated into one component.

The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using the Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using the Bluetooth headset.

The MIPI interface may be configured to connect the processor 110 to peripheral components such as the display 194 or the camera 193. The MIPI interface includes a camera serial interface (CSI), a display serial interface (DSI), or the like. In some embodiments, the processor 110 communicates with the camera 193 through the CSI interface, to implement a photographing function of the electronic device. The processor 110 communicates with the display 194 through the DSI interface, to implement a display function of the electronic device.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type C port, or the like. The USB port 130 may be configured to connect to the charger to charge the electronic device, or may be configured to transmit data between the electronic device and a peripheral device. The USB port 130 may be further configured to connect to a headset, to play audio by using the headset. The port may be further configured to connect to another electronic device such as an AR device.

It may be understood that, an interface connection relationship between the modules shown in this embodiment is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments in which wired charging is used, the charging management module 140 may receive a charging input from the wired charger through the USB port 130. In some embodiments of wireless charging, the charging management module 140 may receive a wireless charging input through a wireless charging coil of the electronic device. The charging management module 140 may further supply power to the electronic device by using the power management module 141 when the battery 142 is charged.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna of the electronic device may be configured to cover one or more communications frequency bands. Different antennas may further be reused, to improve antenna utilization. For example, the antenna 1 may be reused as a diversity antenna in a wireless local area network. In some other embodiments, the antenna may be used in combination with a tuning switch.

The mobile communications module 150 may provide a solution that is applied to the electronic device and that includes wireless communications technologies such as 2G, 3G, 4G, and 5G. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 and at least some modules in the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the telephone receiver 170B, or the like), or displays an image or a video on the display 194. In some embodiments, the modem processor may be an independent component. In some other embodiments, the modem processor may be independent of the processor 110, and is disposed in a same device with the mobile communications module 150 or another functional module.

The wireless communications module 160 may provide a solution that is applied to the electronic device and that is for wireless communication such as a wireless local area network (WLAN) (for example, a Wi-Fi network), Bluetooth (BT), a global navigation satellite system (GNSS), frequency modulation (FM), near field communication (NFC), or an infrared (IR) technology. The wireless communications module 160 may be one or more components that integrate at least one communications processor module. The wireless communications module 160 receives an electromagnetic wave through the antenna 2, performs processing such as frequency modulation and filtering on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-CDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flex light-emitting diode (FLED), a mini-LED, a micro-LED, a micro-OLED, quantum dot light-emitting diodes (QLED), or the like. In some embodiments, the electronic device may include one or N displays 194, where N is a positive integer greater than 1.

The electronic device can implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of the camera through a lens. An optical signal is converted into an electrical signal. The photosensitive element of the camera transmits the electrical signal to the ISP for processing, and converts the electrical signal into a visible image. The ISP may further perform algorithm optimization on noise, luminance, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and the image is projected to the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into a standard image signal in a format such as RGB or YUV. In some embodiments, the electronic device may include one or N cameras 193, where N is a positive integer greater than 1.

The digital signal processor is configured to process a digital signal. In addition to processing a digital image signal, the digital signal processor may also process other digital signals. For example, when the electronic device selects a frequency, the digital signal processor is configured to perform Fourier transform on frequency energy.

The video codec is configured to compress or decompress a digital video. The electronic device may support one or more video codecs. Therefore, the electronic device may play or record videos in a plurality of coding formats, for example, moving picture experts group (MPEG)-1, MPEG-2, MPEG-3, MPEG-4, and the like.

The NPU is a neural-network (NN) computing processor. The NPU quickly processes input information by referring to a biological neural network structure, for example, by referring to a mode of transfer between human brain neurons, and may further continuously perform self-learning. The NPU can implement applications such as intelligent cognition of the electronic device, for example, image recognition, facial recognition, speech recognition, and text understanding.

The external memory interface 120 may be configured to connect to an external storage card, for example, a micro SD card, to extend a storage capability of the electronic device. The external storage card communicates with the processor 110 through the external memory interface 120, to implement a data storage function. For example, a file such as music or a video is stored in the external storage card.

The internal memory 121 may be configured to store computer-executable program code. The executable program code includes instructions. The processor 110 runs the instructions stored in the internal memory 121, to perform various function applications of the electronic device and data processing. The internal memory 121 may include a program storage area and a data storage area. The program storage area may store an operating system, an application required by at least one function (for example, a sound playing function or an image playing function), and the like. The data storage area may store data (such as audio data and an address book) created when the electronic device is used, and the like. In addition, the internal memory 121 may include a high-speed random access memory, and may further include a nonvolatile memory, for example, at least one magnetic disk storage device, a flash storage device, or a universal flash storage (UFS).

The electronic device can implement audio functions, for example, a music playing function and a recording function, by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The telephone receiver 170B, also referred to as an "earpiece", is configured to convert an audio electrical signal into a sound signal. When a call is answered or voice information is received by using the electronic device, the telephone receiver 170B may be put close to a human ear to receive a voice.

The microphone 170C, also referred to as a "mike" or a "mic", is configured to convert a sound signal into an electrical signal. When making a call or sending a voice message, the user may make a sound near the microphone 170C by moving the mouth, to input a sound signal to the microphone 170C. At least one microphone 170C may be disposed in the electronic device. In some other embodiments, two microphones 170C may be disposed in the electronic device, to implement a noise reduction function, in addition to collecting a sound signal. In some other embodiments, three, four, or more microphones 170C may alternatively be disposed in the electronic device, to collect a sound signal and reduce noise. The microphones may further identify a sound source, to implement a directional recording function, and the like.

The headset jack 170D is configured to connect to a wired headset. The headset jack 170D may be the USB port 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is exerted on the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch position based on a detection signal of the pressure sensor 180A. In some embodiments, touch operations that are performed at a same touch position but have different touch operation strength may correspond to different operation instructions. For example, when a touch operation with touch operation strength less than a first pressure threshold is performed on a Messages icon, an instruction for viewing an SMS message is executed. When a touch operation with touch operation strength greater than or equal to the first pressure threshold is performed on the Messages icon, an instruction for creating an SMS message is executed.

The gyro sensor 180B may be configured to determine a motion posture of the electronic device. In some embodiments, angular velocities of the electronic device around three axes (namely, axes x, y, and z) may be determined by using the gyro sensor 180B. The gyro sensor 180B may be configured to perform image stabilization during photographing. For example, when a shutter is pressed, the gyro sensor 180B detects a jitter angle of the electronic device, calculates, based on the angle, a distance for which a lens module needs to compensate, and enables the lens to offset jitter of the electronic device through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device calculates an altitude based on a barometric pressure value measured by the barometric pressure sensor 180C, to assist in positioning and navigation.

The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature such as automatic unlocking upon opening of the flip cover is set based on a detected opening or closing state of the flip cover.

The acceleration sensor 180E may detect magnitude of accelerations in various directions (usually on three axes) of the electronic device, and may detect magnitude and a direction of gravity when the electronic device is still. The acceleration sensor 180E may be further configured to identify a posture of the electronic device, and is applied to applications such as a pedometer and switching between a landscape mode and a portrait mode.

The distance sensor 180F is configured to measure a distance. The electronic device may measure the distance through infrared or laser. In some embodiments, in a photographing scenario, the electronic device may measure the distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a flip cover mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, so as to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 constitute a touchscreen, which is referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a button input, and generate a button signal input related to user settings and function control of the electronic device.

The motor 191 may generate a vibration prompt. The motor 191 may be configured to produce an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light that may be configured to indicate a charging state and a battery power change, and may further be configured to indicate a message, a missed call, a notification, and the like.

The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 is compatible to different types of SIM cards. The SIM card interface 195 is also compatible to an external storage card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

For example, in a video recording scenario (for example, in a special-effect video recording mode or in a time-lapse photographing mode), the camera 193 captures first video frames. The ISP processes the first video frames fed back by the camera 193. The NPU in the processor 110 may perform image segmentation on the first video frames processed by the ISP, to obtain foreground images and background images of the first video frames, and buffer the obtained foreground images and background images. The GPU in the processor 110 fuses the buffered foreground images and background images of different first video frames, to obtain a video with a special effect after the camera 193 captures the first video frames.

Figure 2:
FIG. 2 is a schematic diagram of a video interface according to an embodiment of this application.

The foreground image is an image of a photographed target in the first video frames captured by the camera 193, and the background image is an image of an object, a person, an animal, or the like other than the photographed target in the first video frames captured by the camera 193. A first video frame in FIG. 2 is used as an example. A photographed target is a girl. A foreground image is an image of the girl in the first video frame, and a background image is an image of a boy, a car, a house, or the like in the first video frame.

For example, a video with a special effect includes M second video frames. The $i^{th}$ second video frame in the M second video frames may be obtained through fusing, performed by the GPU, a foreground image of the $k^{th}$ first video frame captured by the camera 193 and a background image of the $j^{th}$ first video frame captured by the camera 193, and the $(i+1)^{th}$ second video frame in the M second video frames may be obtained through fusing, performed by the GPU, a foreground image of the $(k+n)^{th}$ first video frame captured by the camera 193 and a background image of the $(k+m)^{th}$ first video frame, where i, k, j, n, and m are positive integers, and m≠n.

For example, the $i^{th}$ second video frame in the M second video frames may be obtained through fusing, performed by the GPU, the foreground image of the $i^{th}$ first video frame captured by the camera 193 and the background image of the $j^{th}$ first video frame captured by the camera 193, and the $(i+1)^{th}$ second video frame in the M second video frames may be obtained through fusing, performed by the GPU, a foreground image of the $(i+1)^{th}$ first video frame captured by the camera 193 and a background image of the $(j+m)^{th}$ first video frame, where m is a positive integer greater than 1. For example, j and i may meet an expression: $j=(p+1)$ i−p, where $p=m-1$. To be specific, the GPU obtains, at an interval of p frames, a background image from a first video frame captured by the camera 193. It should be noted that in a process in which the camera 193 captures the first video frame, p may be fixed, or may be changed. This is not limited herein.

For another example, the $i^{th}$ second video frame in the M second video frames may be obtained through fusing, performed by the GPU, a background image of the $i^{th}$ first video frame captured by the camera 193 and the foreground image of the $k^{th}$ video frame, and the $(i+1)^{th}$ second video frame in the M second video frames may be obtained through fusing, performed by the GPU, a background image of the $(i+1)^{th}$ first video frame captured by the camera 193 and the foreground image of the $(k+n)^{th}$ first video frame captured by the camera 193, where n is a positive integer greater than 1. Therefore, when a user previews the video with a special effect, a visual effect produced is that a moving speed of the object or the person in the foreground image is accelerated relative to that of the object or the person in the background image in the video frame.

For another example, a video with a special effect includes M second video frames. A background image of the $i^{th}$ second video frame in the M second video frames may be obtained through superimposing, performed by the GPU, background images of the $i^{th}$ first video frame captured by the camera 193 and r first video frames before the $i^{th}$ frame, where r is a positive integer greater than or equal to 1. A foreground image of the $i^{th}$ second video frame in the M second video frames may be the foreground image of the $i^{th}$ first video frame captured by the camera 193. Therefore, when the user watches the video, a ghosting visual effect of a moving object or person in the background image is presented to the user.

For another example, a video with a special effect includes M second video frames. A foreground image of the $i^{th}$ second video frame in the M second video frames may be obtained through superimposing, performed by the GPU, foreground images of the $i^{th}$ first video frame captured by the camera 193 and r first video frames before the $i^{th}$ frame, where r is a positive integer greater than or equal to 1. A background image of the $i^{th}$ second video frame in the M second video frames may be the background image of the $i^{th}$ first video frame captured by the camera 193. Therefore, when the user watches the video, a ghosting visual effect of a moving object or person in the foreground image is presented to the user.

In embodiments of this application, a software system of the electronic device may use a layered architecture, an event-driven architecture, a microkernel architecture, a microservice architecture, or a cloud architecture. In embodiments of this application, a software structure of the electronic device is described by using an Android system with a hierarchical architecture as an example.

Figure 3:
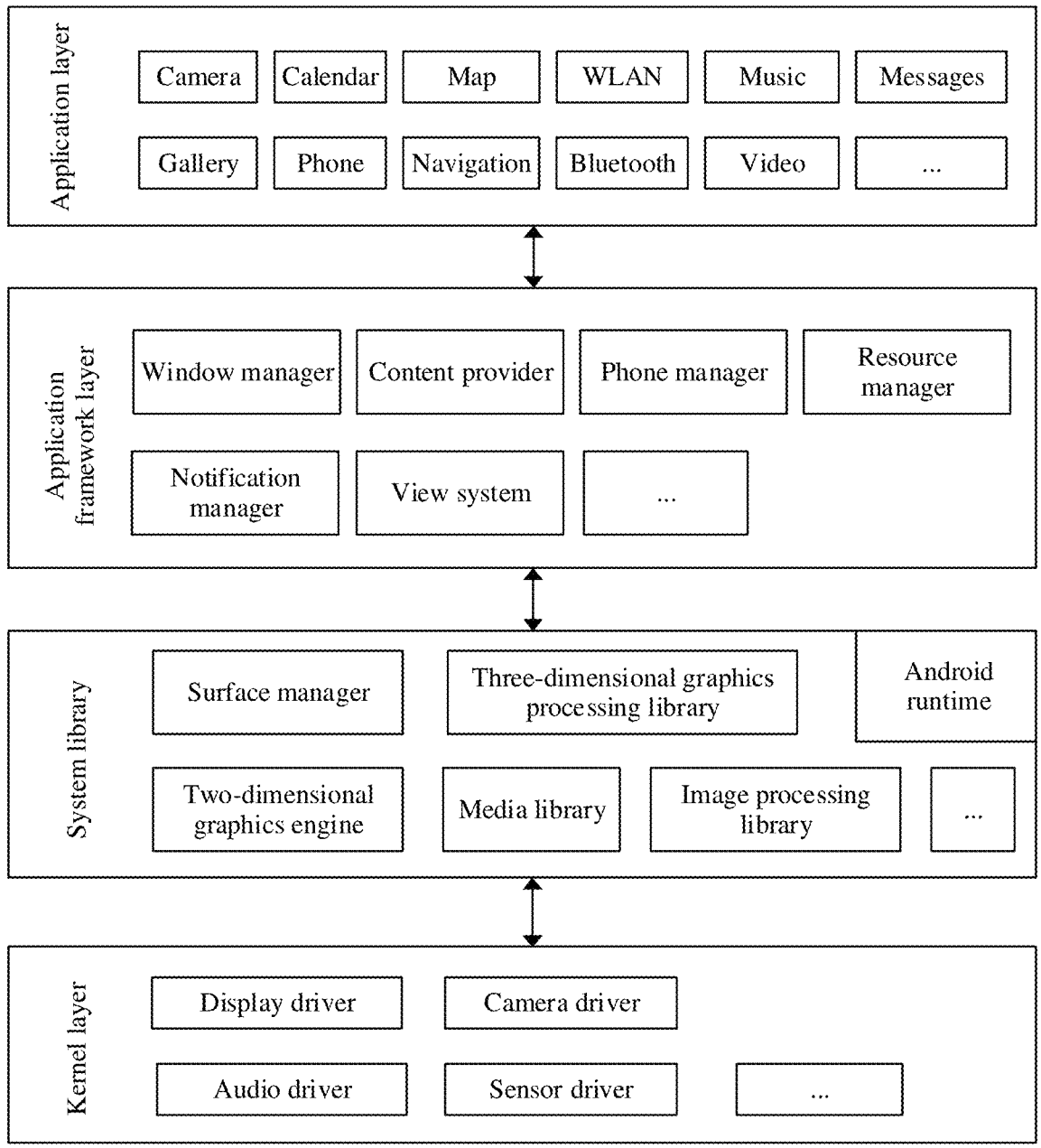
FIG. 3 is a schematic diagram of a software structure of an electronic device according to an embodiment of this application.

Specifically, FIG. 3 is a block diagram of the software structure the electronic device according to an embodiment of this application. Software is divided into several layers by using the layered architecture, and each layer has a clear role and function. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 3, the application packages may include applications such as Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history, a bookmark, an address book, and the like.

The view system includes visual controls such as a control for displaying a text and a control for displaying a picture. The view system may be configured to construct an application. A display interface may include one or more views. For example, a display interface including an SMS message notification icon may include a text display view and an image display view.

The phone manager is configured to provide a communication function of the electronic device, for example, management of a call status (including answering, declining, or the like).

The resource manager provides various resources for an application, such as a localized character string, an icon, an image, a layout file, and a video file.

The notification manager enables an application to display notification information in a status bar, and may be used to convey a message of a notification type. The message may automatically disappear after a short stay without user interaction. For example, the notification manager is configured to notify download completion, give a message notification, and the like. The notification manager may alternatively be a notification that appears in a top status bar of the system in a form of a graph or a scroll bar text, for example, a notification of an application that is run in the background, or may be a notification that appears on the screen in a form of a dialog window. For example, text information is displayed in the status bar, an announcement is produced, the electronic device vibrates, or an indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files of the application layer and the application framework layer to obtain binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video encoding formats, such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Refer to FIG. 3. For example, in this embodiment, the system library may further include an image processing library. After the camera is started, the camera may acquire a first video frame captured by the camera 193. The image processing library may reprocess the first video frame captured by the camera 193, for example, perform image segmentation on the first video frame captured by the camera 193 to obtain a foreground image and a background image, and then fuse foreground images and background images of different first video frames to generate a new video, that is, a video with a special effect. In this way, a user can search the Gallery for a recorded video with a special effect, and watch the recorded video with a special effect by performing an operation on the electronic device.

In the following embodiments, a mobile phone having the structures shown in FIG. 2 and FIG. 3 is used as an example to describe in detail the photographing method in embodiments of this application.

Figure 4A:
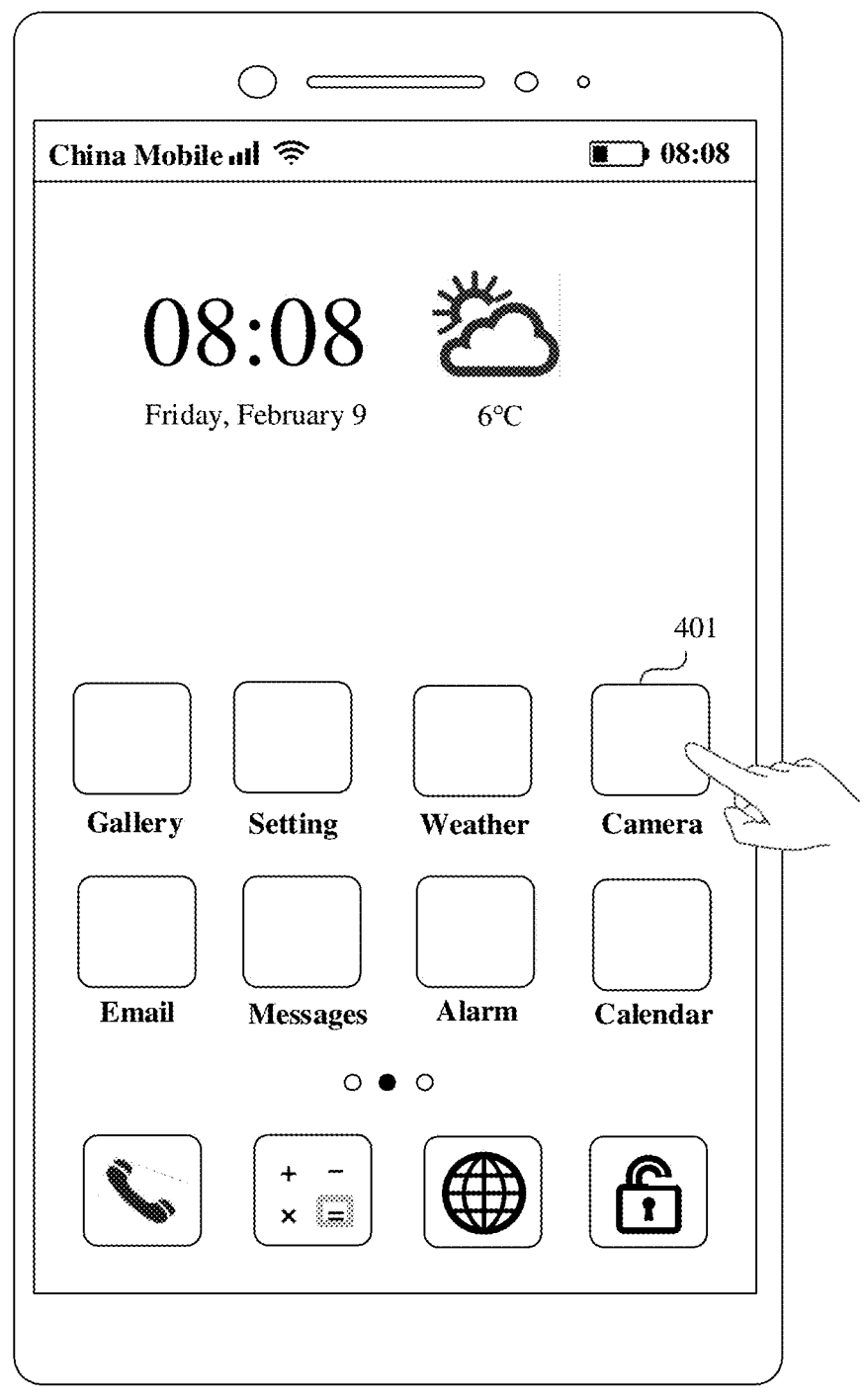
FIG. 4A is a schematic diagram of a user interface according to an embodiment of this application.
Figure 4B:
FIG. 4B is a schematic diagram of another user interface according to an embodiment of this application.

FIG. 4A shows a graphical user interface (GUI) of the mobile phone. The GUI is a home screen of the mobile phone. When a user taps a camera icon 401 on the home screen, the mobile phone may start the camera in response to the operation of tapping the icon 401 by the user, and display a GUI of the camera on a display. For example, the GUI of the camera may be that shown in FIG. 4B, and may also be referred to as a photographing interface. For example, as shown in FIG. 4B, the photographing interface includes a viewfinder frame 402, a photographing control 403, a photographing mode control bar 404, and the like. The viewfinder frame 402 may be used to preview an image or a video frame, and the image or the video frame in the viewfinder frame 403 may be presented based on an image captured by a camera in real time. Specifically, the photographing mode control bar 404 may include a plurality of photographing mode controls, for example, "night", "portrait", "photographing", "video recording", "time-lapse photographing", and "more". Specifically, as shown in FIG. 4B, when "photographing" in the photographing mode control bar 404 is selected, the mobile phone may perform photographing in response to an operation of tapping the photographing control 403 by the user. Alternatively, when "video recording" in the photographing mode control bar 404 is selected, the mobile phone may record a video in response to the operation of tapping the photographing control 403 by the user. When recording a video, if the mobile phone detects that the user taps the photographing control 403, the mobile phone ends video recording in response to the operation of tapping the photographing control 403 by the user, and saves the recorded video. It should be noted that, in this embodiment, the mobile phone may record a video and display a video recording interface on the display in response to a speech instruction, a shortcut gesture operation, or the like of the user, or the mobile phone may end video recording or the like in response to pressing a volume button by the user. An operation of triggering the mobile phone to record a video or end video recording is not limited in this embodiment of this application.

It may be understood that in the photographing mode and the video recording mode (namely, a video shooting mode or scenario), the viewfinder frame 402 may have different sizes. In addition, in the photographing mode and the video recording mode, icons of the photographing control 403 may be different, or in the video recording mode, the icons of the photographing control 403 may also be different when video shooting states are different.

Figure 4C:
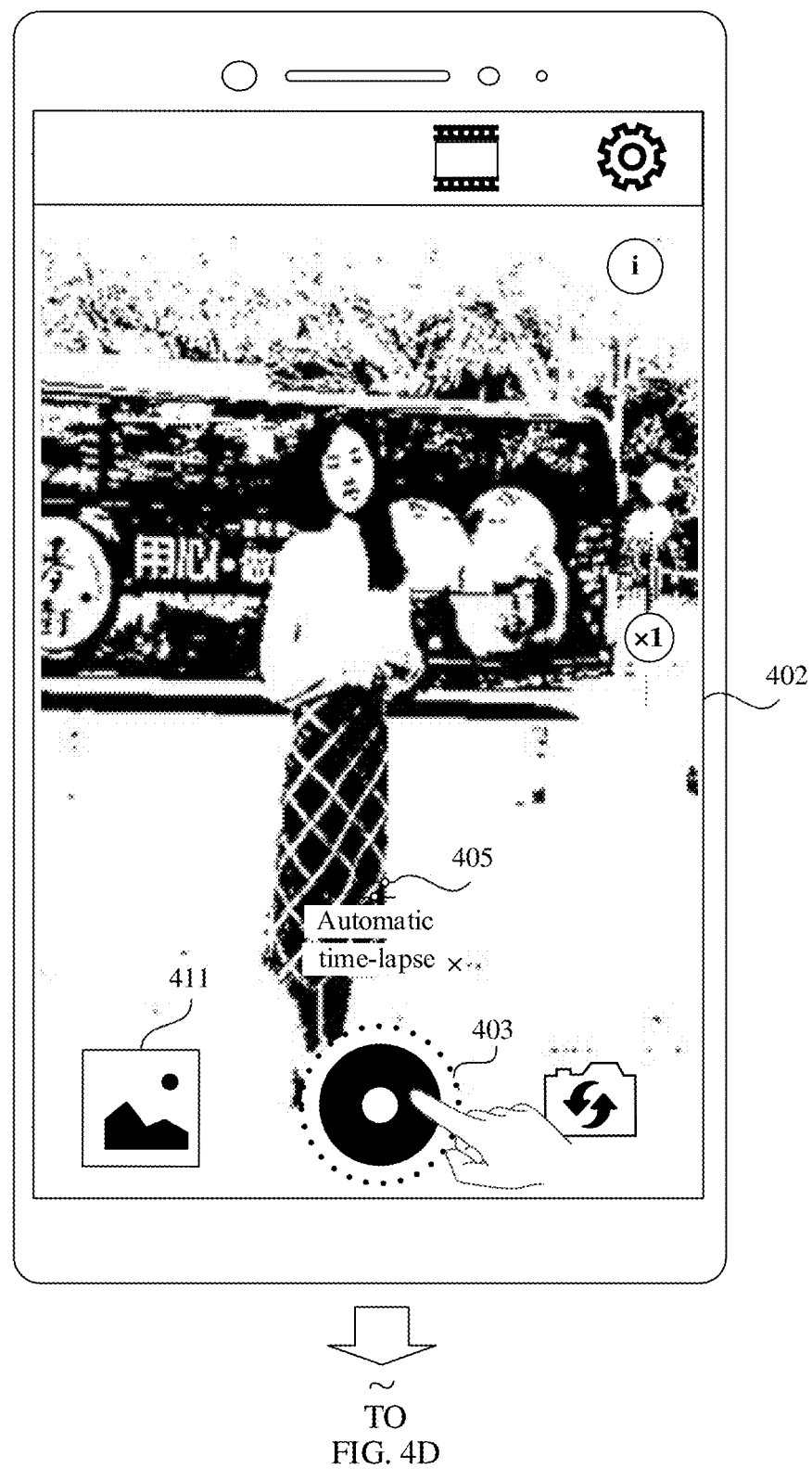
FIG. 4C is a schematic diagram of another user interface according to an embodiment of this application.
Figure 4D:
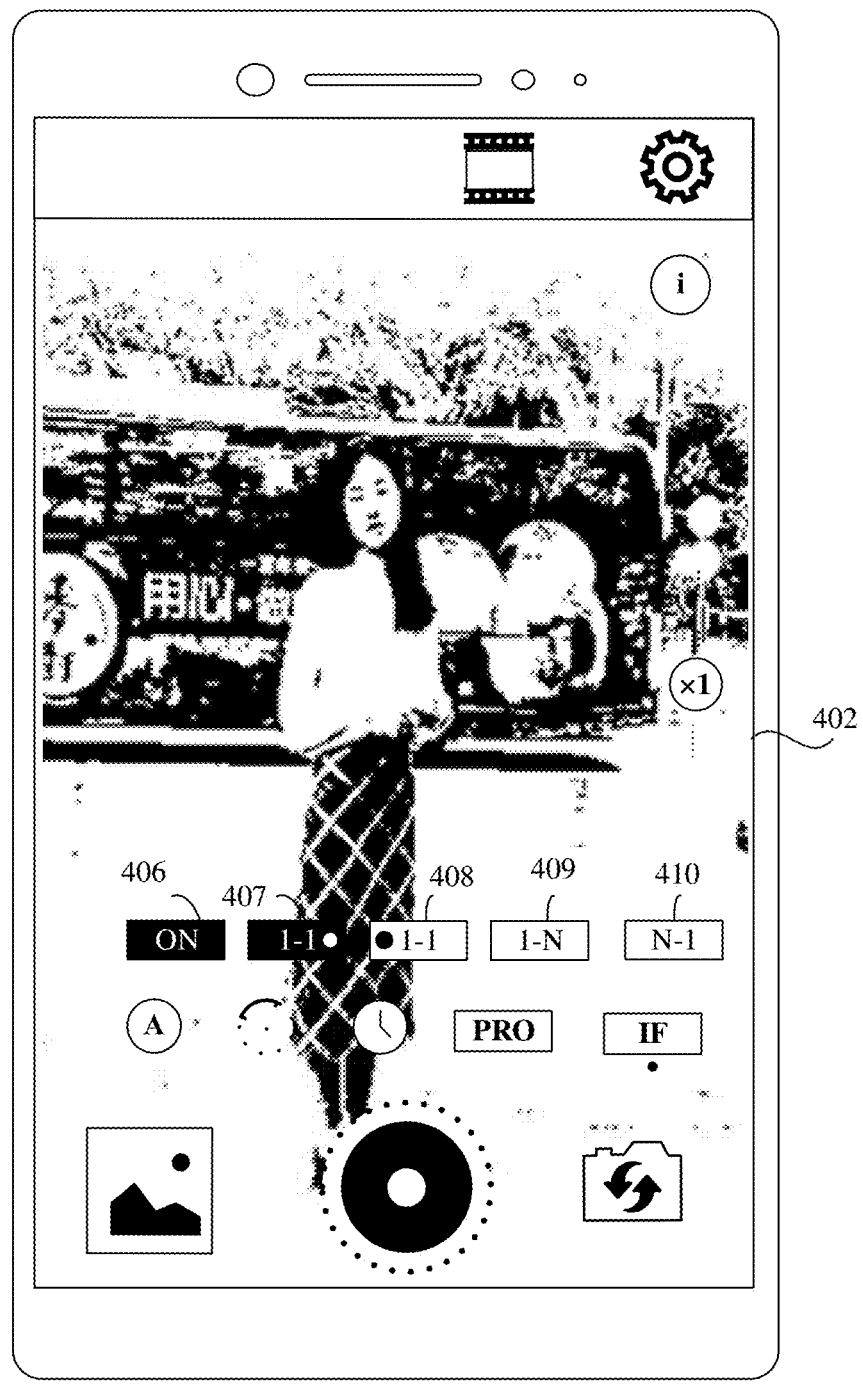
FIG. 4D is a schematic diagram of another user interface according to an embodiment of this application.

In some embodiments, as shown in FIG. 4C, when "time-lapse photographing" in the photographing mode control bar 404 is selected, the mobile phone displays setting controls related to time-lapse photographing on the display in response to an operation of tapping a time-lapse photographing control 405 by the user, for example, an automatic setting control, a frame extraction interval setting control, a recording duration setting control, a professional photographing setting control, and an image fusion (IF) setting control. For example, when the IF setting control is selected by the user, the mobile phone may display setting controls related to image fusion on the display, for example, a control 406 for controlling enabling or disabling of image fusion and image fusion mode controls 407, 408, 409, and 410. It should be noted that a quantity of image mode controls is related to an image fusion mode supported by the mobile phone, and FIG. 4D is merely an example for description. For example, when the mobile phone supports two image fusion modes, when the IF setting control is selected by the user, two image fusion mode controls may be displayed on the display. An interface shown in FIG. 4D is used as an example. The control 407 is used as an example. When the control 406 is enabled, if the control 407 is selected, the mobile phone may fuse, based on an image fusion mode indicated by the control 407, foreground images and background images of different first video frames captured by the camera, and save a video with a special effect after video recording ends.

For example, the image fusion mode indicated by the control 407 is that a play speed of a background is faster than a play speed of a foreground in a video. That is, the mobile phone fuses a foreground image of the $k^{th}$ first video frame captured by the camera and a background image of the $j^{th}$ first video frame captured by the camera, to obtain the $i^{th}$ second video frame in the video with a special effect, where k is less than or equal to j. For example, when i=1, k=j=1. For another example, when i is greater than 1, k is less than j. An image fusion mode indicated by the control 408 is that a play speed of a foreground is faster than a play speed of a background in a video. That is, the mobile phone fuses the foreground image of the $k^{th}$ first video frame captured by the camera and the background image of the $j^{th}$ first video frame captured by the camera, to obtain the $i^{th}$ second video frame in the video with a special effect, where j is less than or equal to k. For example, when i=1, k=j=1. For another example, when i is greater than 1, k is greater than j. An image fusion mode indicated by the control 409 is that continuous ghosting movement is presented in a background in a video. That is, the mobile phone fuses a foreground image of the $i^{th}$ first video frame captured by the camera and a background image obtained by superimposing N first video frames captured by the camera, to obtain the $i^{th}$ second video frame of the video with a special effect. The N first video frames include the $i^{th}$ frame captured by the camera and r first video frames before the $i^{th}$ frame. An image fusion mode indicated by the control 410 is that continuous ghosting movement is presented in a foreground in a video. That is, the mobile phone fuses a background image of the $i^{th}$ first video frame captured by the camera and a foreground image obtained by superimposing the N first video frames captured by the camera, to obtain the $i^{th}$ second video frame of the video with a special effect. The N first video frames include the $i^{th}$ frame captured by the camera and the r first video frames before the $i^{th}$ frame.

Further, in some embodiments, the user may further set a frame extraction interval by tapping the frame extraction interval setting control. For example, when the control 407 is selected, the user may set a moving speed of the background image by tapping the frame extraction interval setting control. A larger frame extraction interval indicates a higher background fast-forward speed. In some other embodiments, when the control 407 is selected, the user may further set a frame extraction interval of the foreground image by tapping the frame extraction interval setting control, that is, a fast-forward effect is also presented in the foreground. It should be noted that, when the control 407 is selected, the frame extraction interval of the foreground image is less than the frame extraction interval of the background image, that is, a fast-forward speed of the foreground is less than a fast-forward speed of the background. The frame extraction interval of the background image may be understood as a quantity of frames between the background images that are extracted from the first video frames captured by the camera. The frame extraction interval of the foreground image may be understood as a quantity of frames between the foreground images that are extracted from the first video frames captured by the camera. For example, a background image is extracted from the first video captured by the camera at an interval of p frames, and a foreground image is extracted from the first video captured by the camera at an interval of 0 frames. The mobile phone may fuse the foreground image of the $i^{th}$ first video frame captured by the camera and the background image of the $j^{th}$ first video frame captured by the camera, to obtain the $i^{th}$ second video frame. The mobile phone may fuse a foreground image of the $(i+1)^{th}$ first video frame captured by the camera and a background image of the $(j+m)^{th}$ first video frame captured by the camera, to obtain the $(i+1)^{th}$ second video frame, where m=p+1.

For another example, when the control 408 is selected, the user may set a frame extraction interval of the foreground image by tapping the frame extraction interval setting control. In some other embodiments, when the control 408 is selected, the user may further set a frame extraction interval of the background image by tapping the frame extraction interval setting control. It should be noted that, when the control 408 is selected, the frame extraction interval of the foreground image is greater than the frame extraction interval of the background image, that is, a fast-forward speed of the foreground is greater than a fast-forward speed of the background. For the frame extraction intervals of the foreground image and the background image, refer to the foregoing related description. Details are not described herein again.

For another example, when the control 409 is selected, the user may set a quantity of frames for background image superimposing by tapping the frame extraction interval setting control. For another example, when the control 410 is selected, the user may set a quantity of frames for foreground image superimposing by tapping the frame extraction interval setting control.

In addition, the user may further set a duration of video recording, for example, 10 minutes, 15 minutes, or 60 minutes, by operating the recording duration setting control. When preset video recording duration is reached, the mobile phone ends video recording, and the video with a special effect is obtained. Alternatively, the mobile phone may end video recording in response to the operation of tapping the photographing control 403 by the user, to obtain the video with a special effect. Further, in some embodiments, when the recording duration for photographing a target reaches first duration, the mobile phone may display a dialog box on the display or play voice information, to prompt the user that photographing for the target ends. For example, the first duration may be 5 minutes, 10 minutes, or the like, and may be set by the user, or may be determined by the mobile phone based on an algorithm or a policy. For example, the user may set the first duration by operating the recording duration setting control. For another example, the first duration may be related to a specified video recording duration. For example, if the video recording duration specified by the user is 60 minutes, the mobile phone may automatically determine that the first duration is 5 minutes. For another example, if the video recording duration specified by the user is 10 minutes, the mobile phone may automatically determine that the first duration is 2 minutes or 5 minutes. Alternatively, the first duration may be specified before the mobile phone is delivered. A manner of setting the first duration is not limited in this embodiment of this application.

Figures 4E, 4F:
FIG. 4E is a schematic diagram of another user interface according to an embodiment of this application.
FIG. 4F is a schematic diagram of another user interface according to an embodiment of this application.
Figure 4F:

Alternatively, in some embodiments, as shown in FIG. 4E, when "special-effect video recording" in the photographing mode control bar 404 is selected, the mobile phone records a video in response to the operation of tapping the photographing control 403 by the user, and displays a video recording interface on the display. For example, the video recording interface may be that shown in FIG. 4F. If the user taps the photographing control 403 on the interface shown in FIG. 4F, the mobile phone ends video recording in response to the operation of tapping the photographing control 403 by the user, and saves the video with a special effect.

For example, the mobile phone may store the video with a special effect in an internal memory, an external memory connected to an external memory interface, a dedicated memory, or the like. This is not limited herein.

An example in which the video with a special effect includes M second video frames is used for description.

Example 1: The $i^{th}$ second video frame in the M second video frames is obtained by fusing the foreground image of the $i^{th}$ first video frame captured by the camera and the background image of the $j^{th}$ first video frame captured by the camera. The $(i+1)^{th}$ second video frame in the M second video frames is obtained by fusing the foreground image of the $(i+1)^{th}$ first video frame captured by the camera and the background image of the $(j+m)^{th}$ first video frame captured by the camera, where m is a positive integer greater than 1.

For example, j and i meet an expression: j=(n+1) i−n, i∈[1, M], and a value of M is obtained by rounding a value of T/(n+1) down to zero decimal places. T is a quantity of frames captured by the camera, and n=m−1, and is the frame extraction interval of the background image.

Specifically, a value of n may be a positive integer greater than or equal to 1, for example, 1, 2, or 3, and may be set by the user based on a requirement of the user, or may be set before delivery of the mobile phone, or may be determined by the mobile phone based on the quantity of first video frames captured by the camera, or the like. A manner of determining n is not limited in this embodiment. For example, the mobile phone may determine the value of n based on a moving speed of an object in the background image and a moving speed of the photographed target in the foreground image. For example, a smaller moving speed of the object in the background image and a smaller actual moving speed of the object in the background image relative to the photographed target in the foreground image indicate a larger value of n. For example, the photographed target in the foreground image basically remains static, a position of the photographed target does not change, a head, an arm, or the like may be slightly moved, and there is a moving person, a moving vehicle, or the like in the background image, in this case, the value of n may be 1 or 2. In this embodiment, the mobile phone may determine the moving speed of the object or the person in the foreground image and the moving speed of the object or the person in the background image based on position changes of the object or the person captured by the camera in different first video frames.

For example, T=60 and n=2. That is, the camera captures 60 first video frames, and a background image is extracted every three first video frames. The mobile phone fuses a foreground image of the $1^{st}$ first video frame captured by the camera and a background image of the $1^{st}$ first video frame to obtain the $1^{st}$ second video frame; fuses a foreground image of the $2^{nd}$ first video frame captured by the camera and a background image of the $4^{th}$ first video frame to obtain the $2^{nd}$ second video frame; and fuses a foreground image of the $3^{rd}$ first video frame captured by the camera and a background image of the $7^{th}$ first video frame to obtain the $3^{rd}$ second video frame. By analogy, the mobile phone fuses a foreground image of the $i^{th}$ first video frame captured by the camera and a background image of the $(3i-2)^{th}$ first video frame to obtain the $i^{th}$ second video frame until a foreground image of the $20^{th}$ first video frame captured by the camera and a background image of the $58^{th}$ first video frame are fused to obtain the $20^{th}$ second video frame. Then, the $1^{st}$ to $20^{th}$ second video frames form the video with a special effect. Because background images of the second video frames except the $1^{st}$ frame in the video with a special effect are presented ahead of foreground images, when the user watches the video, a visual effect presented to the user is that the moving speed of the object or the person in the background image is accelerated relative to the object or the person in the foreground image.

Figures 5A, 5B:
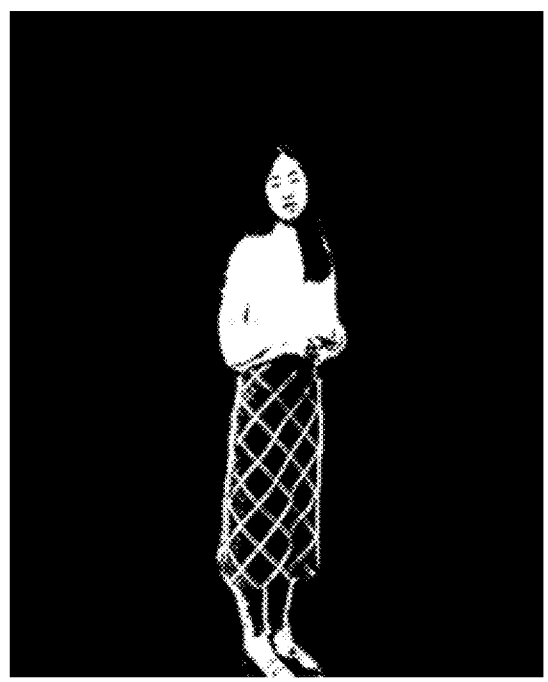
FIG. 5A is a schematic diagram of a foreground image according to an embodiment of this application.
FIG. 5B is a schematic diagram of a background image according to an embodiment of this application.
Figure 5B:
Figures 5B, 5C:
FIG. 5C is a schematic diagram of a second video frame according to an embodiment of this application.

For example, the foreground image of the $i^{th}$ first video frame captured by the camera is shown in FIG. 5A, and the background image of the $(3i-2)^{th}$ first video frame captured by the camera is shown in FIG. 5B. The mobile phone may fuse the images shown in FIG. 5A and FIG. 5B, and the $i^{th}$ second video frame in the video with a special effect is obtained, as shown in FIG. 5C. For example, when the foreground image and the background image are fused, pixel values of pixels within a range of the foreground image are multiplied by a weight value. The weight value may be greater than or equal to 0.5, and less than or equal to 1. For example, within the range of the foreground image, a pixel value of a pixel closer to a boundary of the foreground image is multiplied by a smaller weight value, and a pixel farther from the boundary of the foreground image is multiplied by a larger weight value. For example, a weight value used for multiplying a pixel value of a pixel at the boundary of the foreground image is 0.5, and a weight value used for multiplying a pixel value of a pixel that is within the range of the foreground image and that is farthest from the boundary may be 1. It should be noted that a size of the range of the foreground image is related to a size of the foreground image. A larger foreground image indicates a larger range of the foreground image, and a smaller foreground image indicates a smaller range of the foreground image. In addition, pixel values of pixels within a range of the background image are also multiplied by a weight value. The weight value may be greater than or equal to 0, and less than or equal to 0.5. For example, within the range of the background image, a pixel closer to a boundary of the background image is multiplied by a smaller weight value, and a pixel farther from the boundary of the background image is multiplied by a larger weight value. For example, a weight value used for multiplying a pixel value of a pixel at the boundary of the background image is 0, and a weight value used for multiplying a pixel value of a pixel that is within the range of the background image and that is farthest from the boundary may be 0.5. In this manner, after fusion, the boundaries of the foreground image and the background image are smooth.

It may be understood that, when the foreground image of the $1^{st}$ first video frame captured by the camera is still fused with the background image of the $1^{st}$ first video frame, the mobile phone may directly use the $1^{st}$ first video frame captured by the camera when generating the video with a special effect. This simplifies a processing procedure of the mobile phone.

It should be noted that the foregoing description is merely an example of obtaining the second video frames of the video with a special effect, and does not constitute a limitation on the obtaining the second video frames of the video with a special effect. In addition, in this embodiment, frame extraction intervals between two contiguous background image frames or two contiguous foreground image frames in the video with a special effect may also be different. For example, the frame extraction interval between two contiguous background image frames in the video with a special effect may be correspondingly adjusted based on a moving state of the object or the person in the background image relative to a moving state of the photographed target in the foreground image. For example, the $1^{st}$ second video frame of the video with a special effect is obtained by fusing the foreground image of the $1^{st}$ first video frame captured by the camera and the background image of the $1^{st}$ first video frame. The $2^{nd}$ second video frame of the video with a special effect is obtained by fusing the foreground image of the $2^{nd}$ first video frame captured by the camera and a background image of the $3^{rd}$ first video frame captured by the camera. The $3^{rd}$ second video frame of the video with a special effect is obtained by fusing the foreground image of the $3^{rd}$ first video frame captured by the camera and a background image of the $6^{th}$ first video frame captured by the camera. The $4^{th}$ second video frame of the video with a special effect is obtained by fusing the foreground image of the $4^{th}$ first video frame captured by the camera and a background image of the $10^{th}$ first video frame captured by the camera.

For another example, foreground images of all second video frames of the video with a special effect are the foreground image of the $i^{th}$ first video frame captured by the camera, for example, i=1 or 2. This is not limited herein.

Figure 4G:
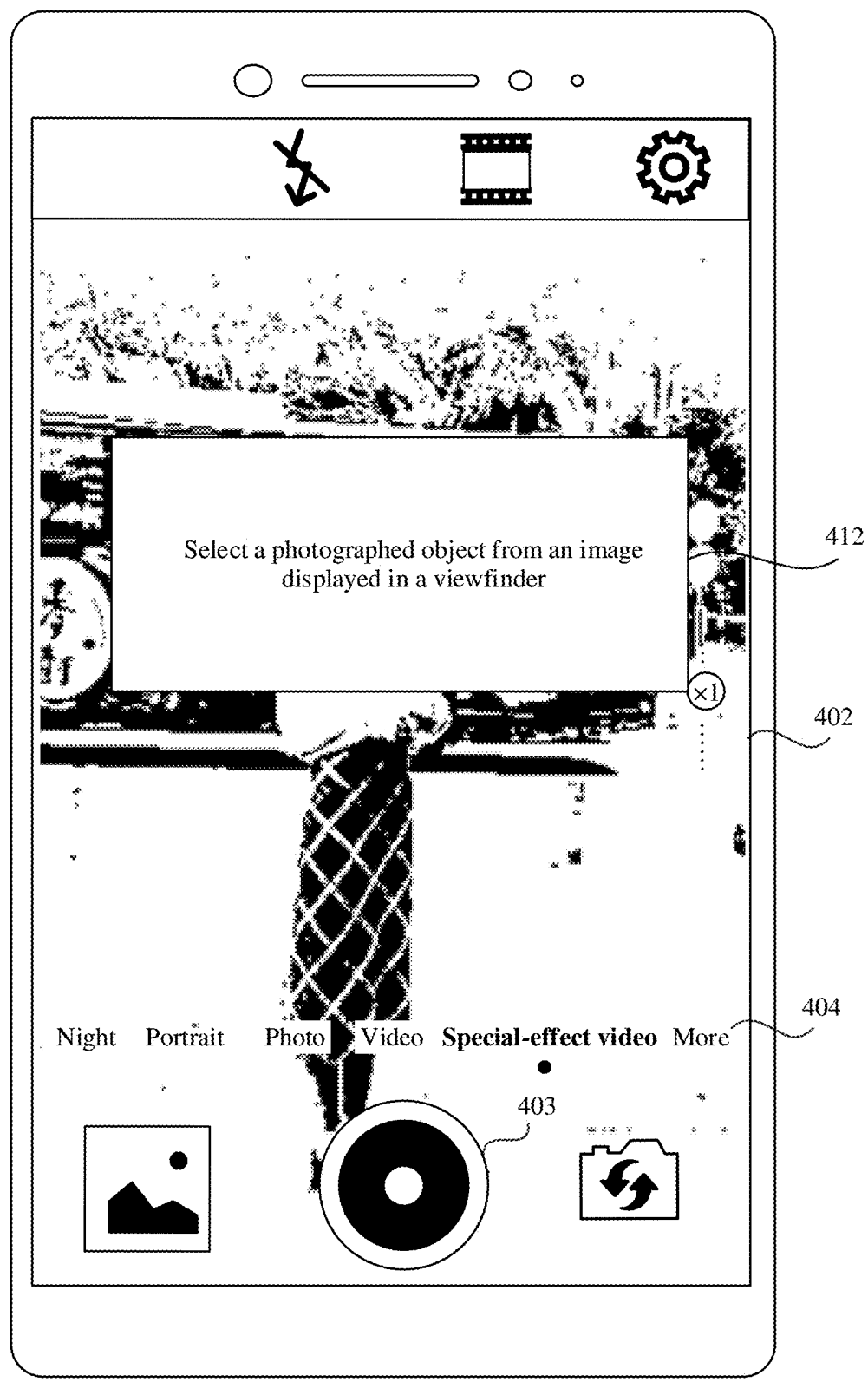
FIG. 4G is a schematic diagram of another user interface according to an embodiment of this application.

Specifically, a first video frame captured by the camera is used as an example. In this embodiment, a foreground image of the first video frame is an image of a photographed target, and a background image is an image in the first video frame other than the image of the photographed target. For example, when the viewfinder frame 402 displays a first video frame captured by the camera, the mobile phone may use, as the photographed target, an object that is selected by the user in the first video frame and that is displayed in the viewfinder frame 402. For example, when displaying the interface shown in FIG. 4B, the mobile phone may display an interface shown in FIG. 4G on the display in response to an operation of selecting "special-effect video recording" in the photographing mode control bar 404 by the user. The interface includes a dialog box 412, and the dialog box 412 includes information prompting the user to select a photographed target from an image displayed in the viewfinder frame. For example, the user may tap any part of an object displayed in the viewfinder frame 402. In this case, the mobile phone uses the object tapped by the user as the photographed target in response to the operation of tapping the object displayed in the viewfinder frame 402 by the user. FIG. 4B is used as an example. When the user taps the girl (for example, a face or a skirt of the girl) displayed in the viewfinder frame 402, the mobile phone uses the girl as the photographed target. It may be understood that the user usually taps the photographing control 403 to start video recording after selecting the photographed target in the viewfinder frame 402. For another example, when displaying the interface shown in FIG. 4D, the mobile phone displays a dialog box on the display in response to an operation of setting the control 406 to ON. The dialog box includes information prompting the user to select the photographed target from the image displayed in the viewfinder frame. Further, in some other embodiments, the mobile phone may further display, on the display in response to the operation of setting the control 406 to ON, the operation of selecting "special-effect video recording", or the selecting the photographed target by the user, a prompt that prompts the photographed target to remain almost stationary. For example, the photographed target is a person. The photographed target being almost stationary may be understood as that the photographed target remains stationary, or a hand, a head, or another part of the photographed target moves slightly. For example, the photographed target moves a finger, a head, or the like.

In addition, in some embodiments, the mobile phone may automatically identify the image in the viewfinder frame 402, and determine the photographed target in the image in the viewfinder frame 402 by using an algorithm or a rule (for example, a neural network algorithm). For example, the mobile phone may automatically identify, based on the image in the viewfinder frame 402, sizes and positions of different objects captured by the camera in the image displayed in the viewfinder frame 402, and use, as the photographed target, a photographed object that occupies a relatively large area and that is around a center of the image in the viewfinder frame 402.

In some embodiments, in a video recording process, each time a first video frame is captured by the camera, the mobile phone may perform image segmentation on the first video frame to obtain a foreground image and a background image of the first video frame. Further, for another example, in the video recording process, after the mobile phone performs image segmentation to obtain the foreground image of the i$^{th}$ first video frame and the background image of the j$^{th}$ first video frame, the mobile phone may fuse the foreground image of the i$^{th}$ first video frame and the background image of the j$^{th}$ first video frame. This improves processing efficiency of the mobile phone.

Alternatively, after video recording ends, the mobile phone may perform image segmentation on first video frames captured by the camera. For example, after video recording ends, the mobile phone may perform image segmentation on T first video frames captured by the camera. For another example, image segmentation is performed on first video frames that are in the T first video frames captured by the camera and that need to be refused, and image segmentation is not performed on first video frames that do not need to be refused.

Figure 6:
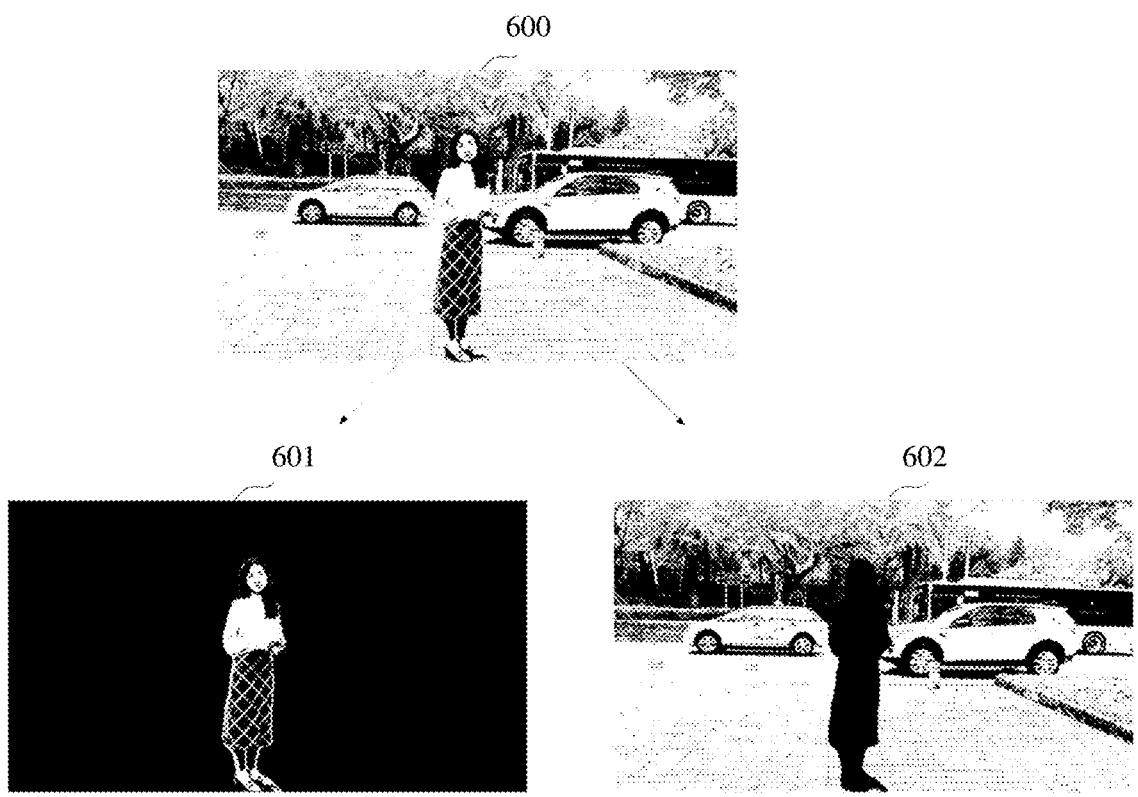
FIG. 6 is a schematic diagram of image segmentation of a first video frame according to an embodiment of this application.

For example, a first video frame captured by the camera is a video frame 600 shown in FIG. 6. For example, a girl in the video frame 600 is the photographed target. The mobile phone performs image segmentation on the video frame 600 to obtain a foreground image 601 and a background image 602 of the video frame 600. For example, the mobile phone may perform, by using a convolutional neural network (CNN)-based segmentation method, a threshold-based segmentation method, a region-based segmentation method, an edge-based segmentation method, a segmentation method that is based on a specific theory, or the like, image segmentation on the first video frame captured by the camera, to obtain the foreground image and the background image of the first video frame.

An example in which a CNN-based segmentation method is used to segment the image of the first video frame into the foreground image and the background image is described.

Based on this algorithm, after obtaining the first video frame captured by the camera, the mobile phone may perform downsampling on the first video frame and convert the first video frame into an image with a low resolution for complex CNN calculation, to reduce a calculation workload.

Figure 7:
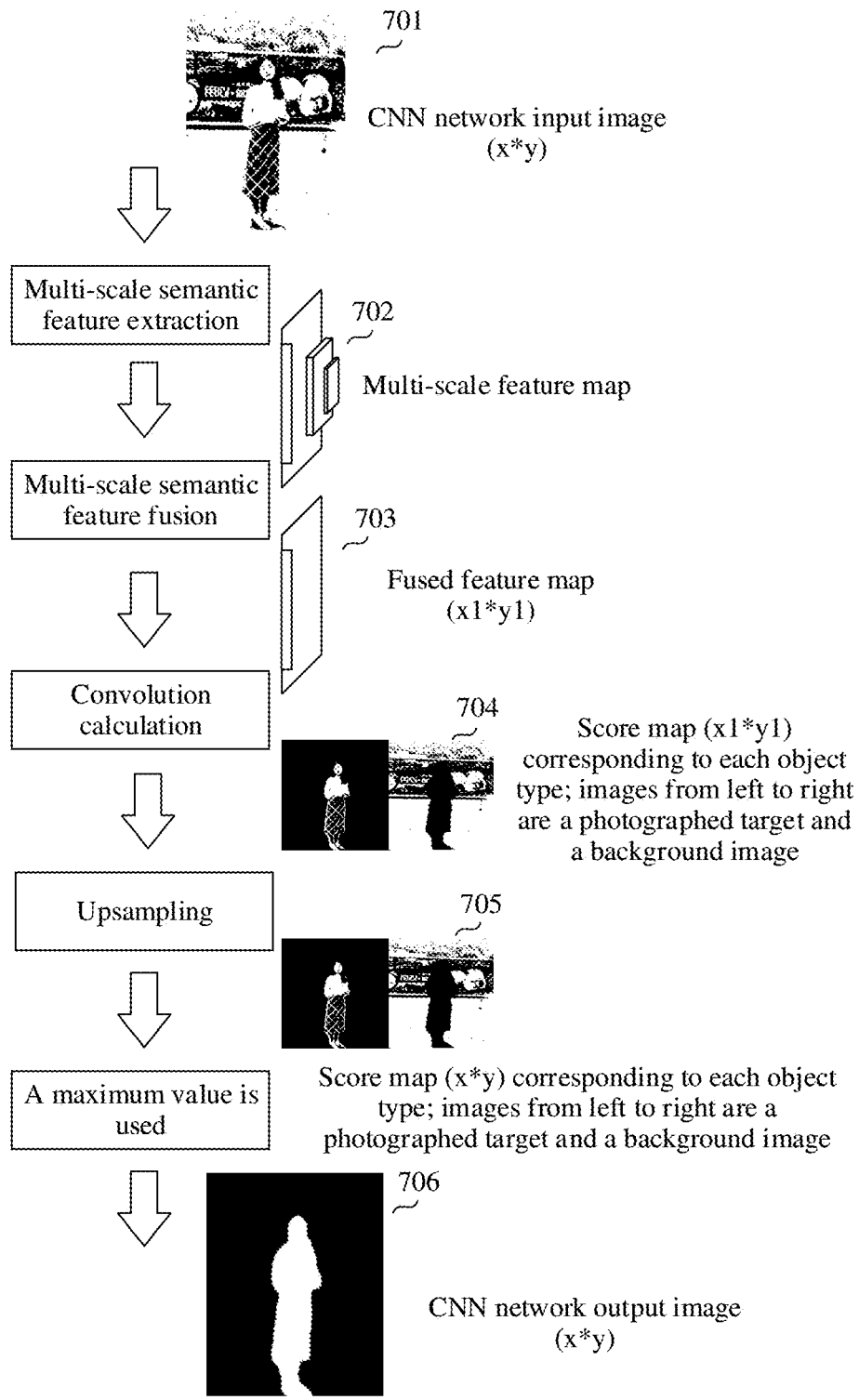
FIG. 7 is a schematic flowchart of a method for image segmentation of a first video frame according to an embodiment of this application.

For example, a first video frame captured by the camera is the video frame 600. The video frame 600 has a size of X*Y (that is, an image resolution of the video frame 600 is X*Y), a unit for image segmentation is an object type, and the object type includes a photographed target (for example, a person) and a background image. Refer to FIG. 7. The mobile phone processes the video frame 600 into an image 701 with a size of x*y, where x is less than X, and y is less than Y. The mobile phone extracts semantic features of the image layer by layer through convolution and downsampling (including but not limited to stride convolution and pooling), to obtain multi-scale feature maps 702 whose sizes are respectively x1*y1, x2*y2, and x3*y3, where x1, x2, and x3 are multiples and less than x, and y1, y2, and y3 are multiples and less than y. Then, the mobile phone fuses the obtained multi-scale feature maps 702 through convolution and upsampling, to obtain a fused feature map 703 with a size of x1*y1. Then, the mobile phone performs convolution calculation on the feature map 703 obtained by fusion, and calculates a segmentation score of each pixel in the photographed target and the background image, to obtain two score maps 704, that is, a score map of the foreground image and a score map of the background image. Sizes of the score maps are x1*y1. Upsampling is performed on each of the obtained two score maps, to obtain two score maps 705 with sizes of x*y. Segmentation scores of corresponding pixels on the two score maps are compared with each other pixel by pixel. An object type corresponding to a score map with a largest segmentation score is an object type corresponding to a current pixel. In this case, an object type corresponding to each pixel is obtained, that is, a mask 706 (with a size of x*y) is obtained. On the mask 706, regions corresponding to different object types have different marks. For example, colors of the regions corresponding to different object types are different. After the mask is obtained, upsampling is performed on the mask to obtain a size of X*Y that is the same as the size of the original image. In this way, pixel regions corresponding to different object types on the video frame 600 may be obtained by comparing the video frame 600 with the mask, so that the video frame 600 is segmented into the foreground image and the background image.

Figure 8:
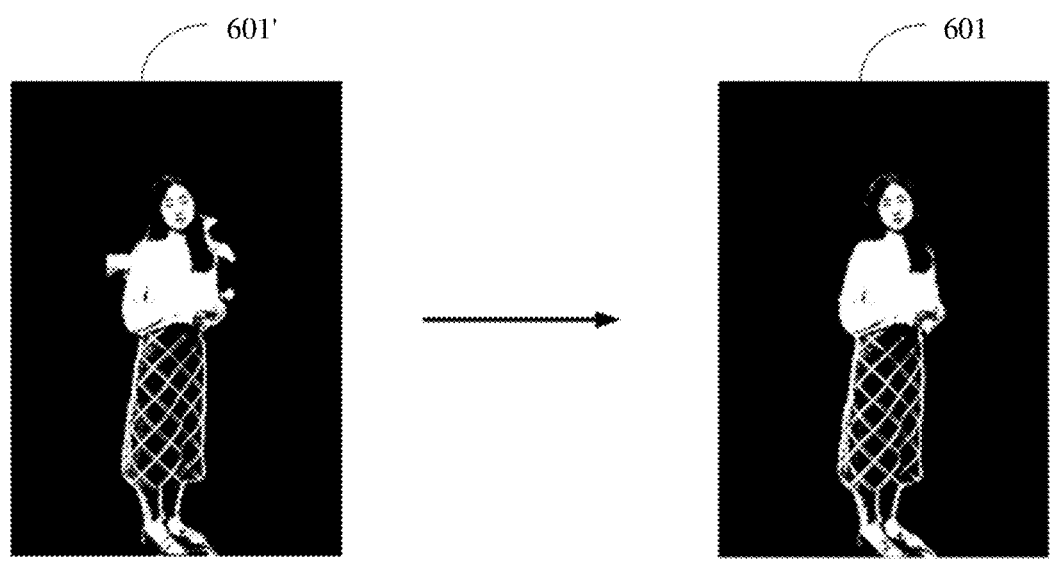
FIG. 8 is a schematic diagram of a foreground image according to an embodiment of this application.

Further, in some embodiments, after obtaining the foreground image of the video frame 600 by comparing the video frame 600 with the mask, the mobile phone may further optimize the obtained foreground image of the video frame 600 with reference to depth information of the video frame 600, so as to obtain the foreground image 601 of the video frame 600. For example, as shown in FIG. 8, the mobile phone obtains a foreground image 601' of the video frame 600 by comparing the video frame 600 with the mask 706, and then optimizes the foreground image 601' with reference to the depth information of the video frame 600, to obtain the foreground image 601. The foreground image 601 is used as the foreground image of the video frame 600. Therefore, accuracy of the foreground image of the video frame can be improved.

For example, the mobile phone may perform clustering on depth information of the foreground image 601' in the video frame 600, to obtain the foreground image 601. The foreground image 601 has the depth information of a same cluster and also a large region. It should be noted that, in this embodiment, a clustering algorithm used for clustering the depth information of the foreground image 601' in the video frame 600 is not limited.

Specifically, the depth information of the video frame 600 may be obtained by the mobile phone when the mobile phone records a video by using the camera. For example, the mobile phone may perform distance measurement on a target (for example, an object, a plant, a house, or a person) in a photographing scenario by using a dual-camera or a time of flight (TOF) camera, to obtain the depth information of the video frame. This improves reliability of image segmentation.

In addition, the mobile phone may further use an image other than the foreground image 601 in the foreground image 601', and a background image that is of the video frame 600 and that is obtained by comparing the video frame 600 with the mask 706 as the background image 602 of the video frame 600.

In some other embodiments, the mobile phone further saves a video without a special effect in response to an operation of tapping the photographing control 403 by the user. The video without a special effect includes the first video frames captured by the camera. For example, the video without a special effect and a video with a special effect that corresponds to the video without a special effect are stored in a folder. It should be understood that the second video frames included in the video that has a special effect and that corresponds to the video without a special effect is obtained through frame extraction, image segmentation, and image fusion based on the first video frames captured by the camera in the video without a special effect.

It should be noted that, in the foregoing embodiment, in the process of video recording by the mobile phone, the video frames displayed in the viewfinder frame 402 are the first video frames captured by the camera, instead of the second video frames of the video with a special effect. After the recording ends, the user may play the stored recorded video with a special effect on the display by performing an operation on the mobile phone.

Figure 9A:
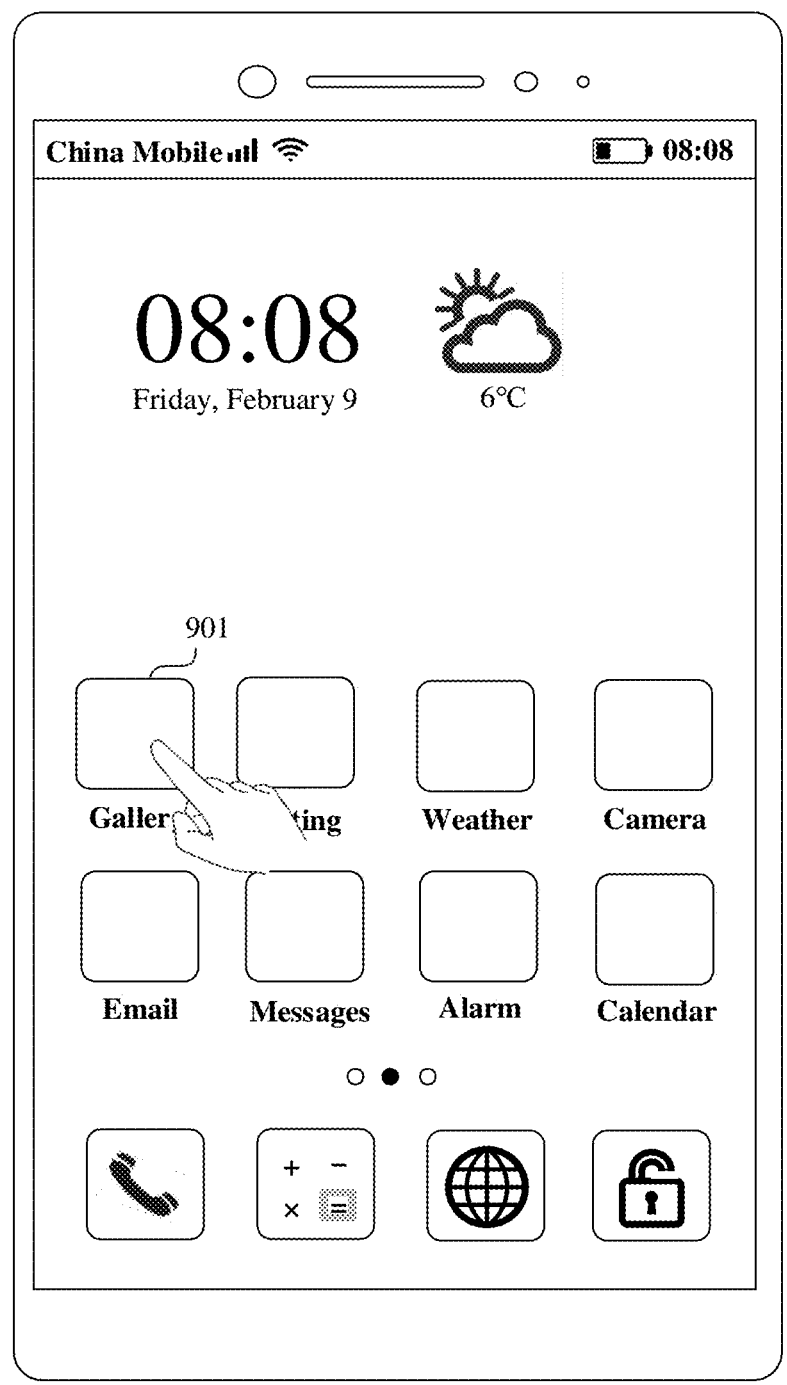
FIG. 9A is a schematic diagram of another user interface according to an embodiment of this application.
Figure 9B:
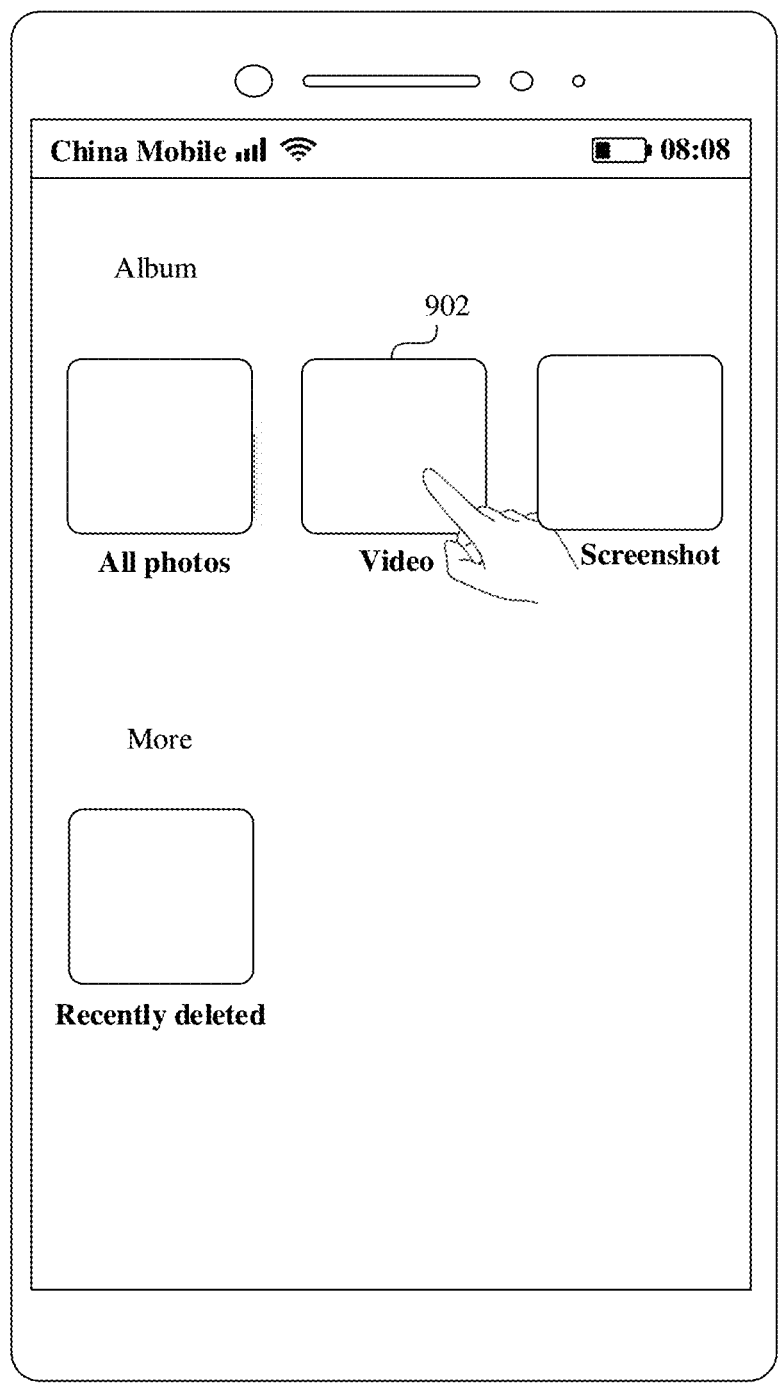
FIG. 9B is a schematic diagram of another user interface according to an embodiment of this application.

For example, as shown in FIG. 4C, when "special-effect video recording" in the photographing mode control bar 404 is selected, after video recording ends, the user may tap the control 405, so that the mobile phone displays a last recorded video that has a special effect on the display in response to the operation of tapping the control 405 by the user. For another example, when the mobile phone displays a home screen shown in FIG. 9A, the user may tap a Gallery icon 901, so that the mobile phone displays a Gallery interface on the display in response to the operation of tapping the gallery icon 901 by the user. For example, the Gallery interface may be that shown in FIG. 9B. The user may view a stored video with a special effect by tapping the control 902, to view a corresponding video with a special effect on the display based on a requirement of the user.

It should be noted that the foregoing is described by using an example in which, for a user, a visual effect generated in the video with a special effect is that the moving speed of the object or the person in the background image is accelerated relative to that of the object or the person in the foreground image. When the $i^{th}$ second video frame in the video with a special effect is obtained by fusing the foreground image of the $k^{th}$ first video frame captured by the camera and the background image of the $i^{th}$ first video frame captured by the camera, for a user, a visual effect generated in the video with a special effect is that the moving speed of the object, the person, or the like in the foreground image is accelerated relative to that of the object or the person in the background image. For a specific implementation, refer to the implementation in which the $i^{th}$ second video frame in the video with a special effect is obtained by fusing the foreground image of the $i^{th}$ first video frame captured by the camera and the background image of the $j^{th}$ first video frame captured by the camera. Details are not described herein again.

In addition, when image segmentation is performed on the first video frame captured by the camera, and then fusion is performed on the background images and the foreground images of different first video frames, a visual effect can be further obtained, which is that movement of a person, an object, and the like is accelerated simultaneously in the video with a special effect relative to that of the person, the object, and the like in the first video frames captured by the camera.

Example 2: The $i^{th}$ second video frame in the M second video frames is obtained by fusing the foreground image of the $k^{th}$ first video frame captured by the camera and the background image of the $i^{th}$ first video frame captured by the camera. The $(i+1)^{th}$ second video frame in the M second video frames is obtained by fusing a foreground image of the $(k+n)^{th}$ video frame captured by the camera and a background image of the $(i+1)^{th}$ video frame captured by the camera, where n is a positive integer greater than 1.

Example 3: A background image of the $i^{th}$ second video frame in the M second video frames is obtained by superimposing background images of the $i^{th}$ first video frame captured by the camera and the r first video frames before the $i^{th}$ frame. A foreground image of the $i^{th}$ second video frame in the M second video frames is the foreground image of the $i^{th}$ first video frame captured by the camera.

For example, a value of r may be a positive integer greater than or equal to 1, for example, 1, 2, 3, 4, or 5. Specifically, the value may be predefined, or may be determined by the mobile phone based on an algorithm or a rule, or may be set by the user based on a requirement of the user. This is not limited herein. For example, when the value of r is 9, and a quantity of first video frames captured by the camera is less than or equal to 9, because there are less than nine first video frames before the $9^{th}$ first video frame, when i is less than or equal to 9, that is, for background images of the first nine frames in the second video frames in the video with a special effect, the mobile phone may superimpose background images of the $i^{th}$ frame captured by the camera and all first video frames before the $i^{th}$ frame. When i is greater than 9, that is, for background images of the $10^{th}$ second video frame and second video frames after the $10^{th}$ second video frame of the video with a special effect, the mobile phone may superimpose background images of the $i^{th}$ first video frame captured by the camera and nine first video frames before the $i^{th}$ frame. For example, a background image of the $11^{th}$ second video frame in the video with a special effect is obtained by superimposing background images of the $2^{nd}$ to $11^{th}$ first video frames captured by the camera. For example, the mobile phone may multiply pixels of the background images of the $2^{nd}$ to $11^{th}$ first video frames captured by the camera by weight values, and then superimpose pixels that are obtained after multiplying the weight values and that correspond to the background images of the $2^{nd}$ to $11^{th}$ first video frames, to obtain a background image of the $11^{th}$ video frame of the video with a special effect. It should be noted that, to achieve a better ghosting visual effect for the object or the person in the background image, for the $2^{nd}$ to $11^{th}$ first video frames, the weight values by which the pixels of the background images of different frames are multiplied are different, but a sum of the weight values corresponding to the background images of the $2^{nd}$ to $11^{th}$ first video frames is 1. The weight values respectively corresponding to the background images of the $2^{nd}$ to $11^{th}$ first video frames may increase in ascending order. That is, a weight value corresponding to the background image of the $2^{nd}$ first video frame is the smallest, and a weight value corresponding to the background image of the $11^{th}$ first video frame is the largest. Alternatively, the weight values corresponding to the background images of the $2^{nd}$ to $10^{th}$ first video frames are the same, and the weight value corresponding to the background image of the $11^{th}$ first video frame is greater than the weight values corresponding to the background images of the $2^{nd}$ to $10^{th}$ first video frames.

Figure 10:
FIG. 10 is a schematic diagram of another second video frame according to an embodiment of this application.

In this embodiment, the background image of the $i^{th}$ second video frame in the second video frames that exclude the first frame in the video with the special effect is obtained by superimposing the background images of the $i^{th}$ frame captured by the camera and the r first video frames before the $i^{th}$ frame. In this case, when the user watches the video, a ghosting visual effect of the moving object or person in the background image is presented to the user. For example, a second video frame of the video with a special effect is shown in FIG. 10.

It may be understood that, in some other embodiments, background images of different second video frames of the video with a special effect may alternatively be obtained by superimposing the background images of different first video frames captured by the camera. For example, the background image of the $11^{th}$ second video frame in the video with a special effect is obtained by superimposing background images of the $11^{th}$ first video frame captured by the camera and nine first video frames before the $11^{th}$ first video frame. A background image of the $12^{th}$ second video frame in the video with a special effect is obtained by superimposing background images of the $12^{th}$ frame captured by the camera and eight or ten first video frames before the $12^{th}$ frame. For example, the mobile phone may adjust, based on a status of the first video frames captured by the camera, a quantity of background image frames for superimposing. For example, when the moving speed of the object or the person in the background image is large relative to that of the photographed target in the foreground image, the quantity of background image frames for superimposing may be adjusted to a small value. When the moving speed of the object or the person in the background image is small relative to that of the photographed target in the foreground image, the quantity of background image frames for superimposing may be adjusted to a large value.

It should be noted that, in some embodiments, in the video recording process, each time a first video frame is captured, the mobile phone may perform image segmentation on the first video frame to obtain a background image and a foreground image of the first video frame. After background images of a plurality of first video frames are obtained, the mobile phone may perform superimposing on the plurality of background images, and then fuse the superimposed background images and a foreground image of a current video frame until video recording ends. In this case, in the video recording process, the mobile phone may display a second video frame obtained through image fusion in the viewfinder frame, so that the user can preview a video frame with a special effect during video recording. This makes video recording more interesting. For example, the mobile phone may display the $i^{th}$ second video frame in the viewfinder frame when the camera captures the $i^{th}$ first video frame.

In addition, after video recording ends, the mobile phone may further perform image segmentation on the first video frames captured by the camera, superimpose the background images, and then fuse the foreground image and the superimposed background image to obtain the video with a special effect.

Example 4: The background image of the $i^{th}$ second video frame in the M second video frames is obtained by superimposing the foreground images of the $i^{th}$ first video frame captured by the camera and the r first video frame before the $i^{th}$ frame. The background image of the $i^{th}$ first video frame in the video with a special effect is the background image of the $i^{th}$ first video frame captured by the camera.

For example 4, refer to the related description in Example 3. Details are not described herein again.

It should be noted that, in this embodiment, for the related description of image segmentation and fusion of the background images and the foreground images in Example 2, Example 3, and Example 4, refer to the description in Example 1. Details are not described herein again.

In addition, in this embodiment, the foreground image of the second video frame in the video with a special effect is obtained by superimposing the foreground images of the plurality of first video frames captured by the camera. The background image of the second video frame in the video with a special effect is the background image of the first video frame captured by the camera, and superimposing is not performed.

In addition, in the foregoing examples, the mobile phone may further perform zooming processing after the foreground images and the background images of different frames are fused, so that when the user previews the video with a special effect, the photographed target may gradually be zoomed in or zoomed out as time goes.

Generally, the foregoing two manners of recording the video with a special effect are applied to a scenario in which the photographed target has a small moving speed or the target is stationary. When the photographed target has a large moving speed, in fusion of the background images and the foreground images of different first video frames captured by the camera, position movement of the photographed target needs to be considered, so as to implement better fusion of the background images and the foreground images.

An embodiment of this application further provides a method for manufacturing a video with a special effect. Specifically, a mobile phone may synthesize the video with a special effect based on W image files in stored image files. The image files may include a video and/or a picture. The W image files may be selected by a user, or may be intelligently identified by the mobile phone based on an algorithm or a policy. W is a positive integer greater than 1.

Figure 11A:
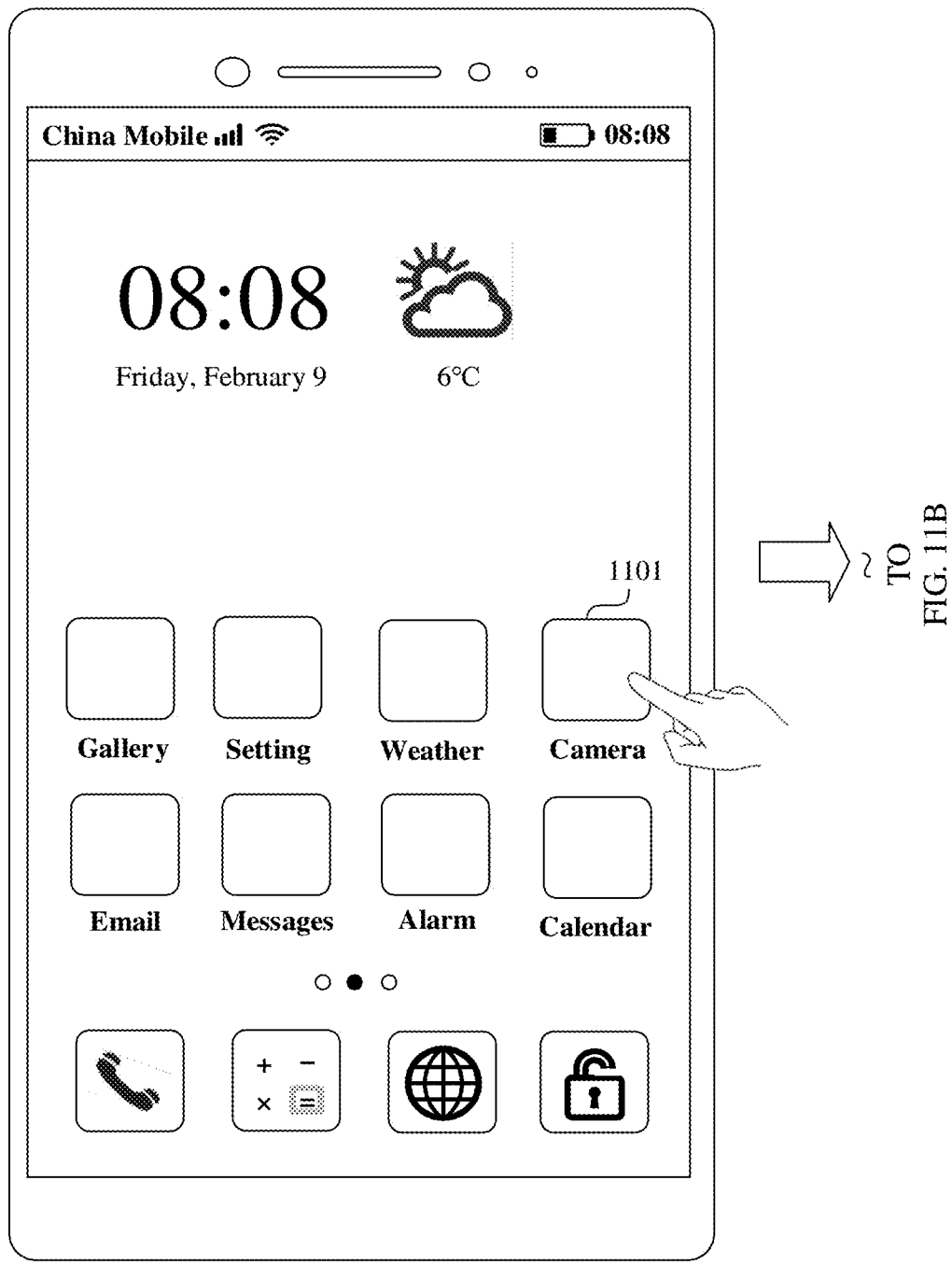
FIG. 11A is a schematic diagram of another user interface according to an embodiment of this application.
Figure 11B:
FIG. 11B is a schematic diagram of another user interface according to an embodiment of this application.
Figure 11C:
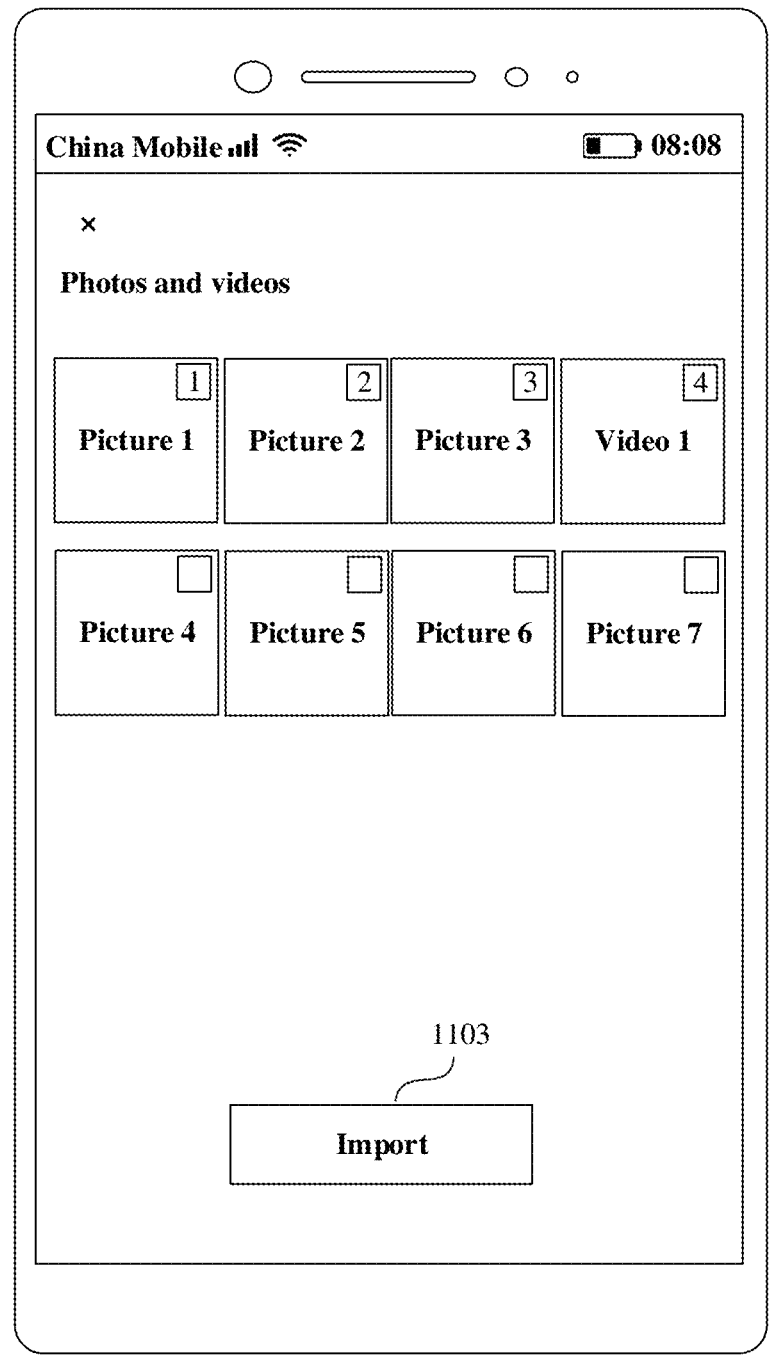
FIG. 11C is a schematic diagram of another user interface according to an embodiment of this application.
Figure 11D:
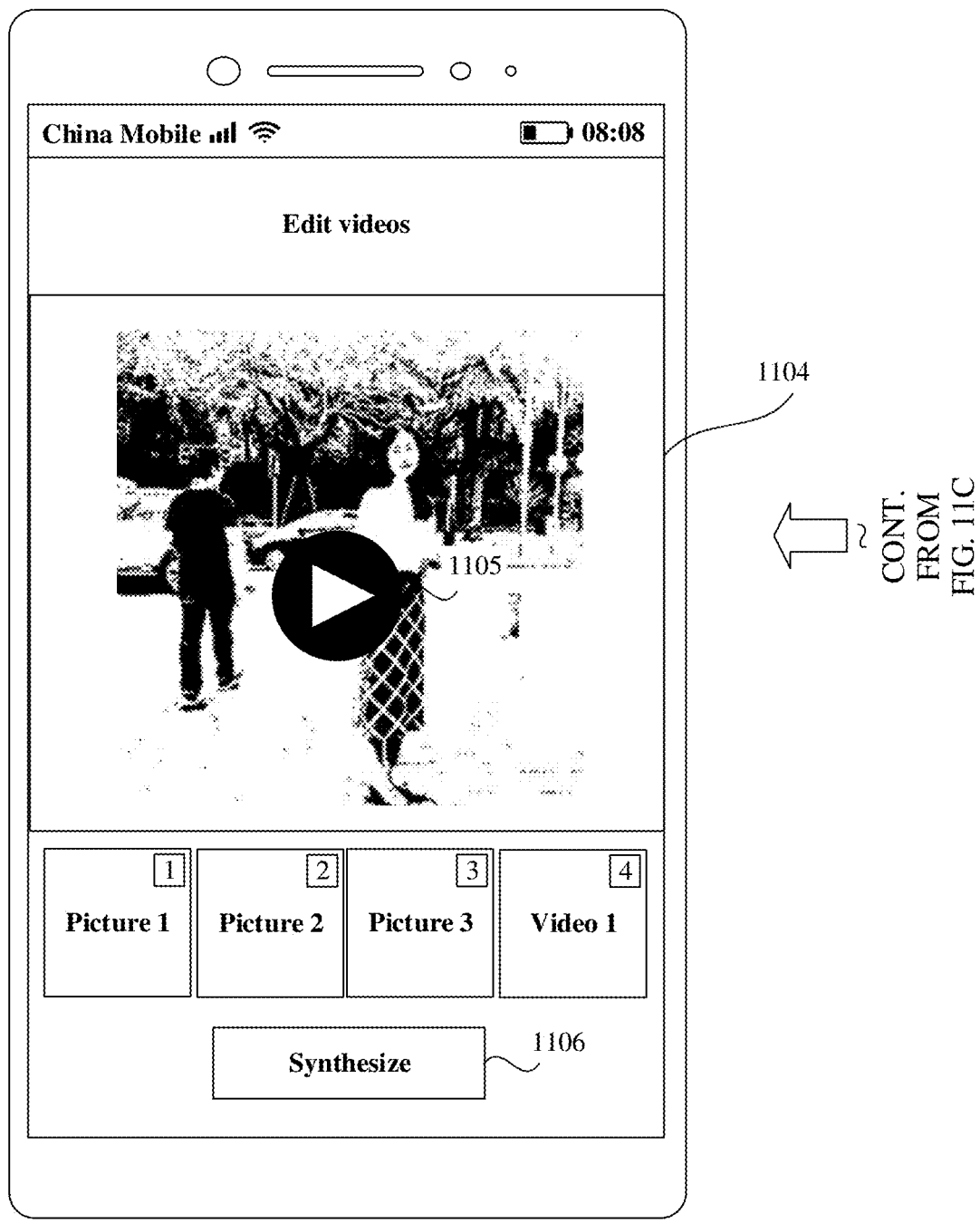
FIG. 11D is a schematic diagram of another user interface according to an embodiment of this application.

For example, the mobile phone displays, on a display, an interface shown in FIG. 11A. The mobile phone displays a photographing interface on the display in response to an operation of tapping a camera icon 1101 by the user. For example, the photographing interface may be an interface shown in FIG. 11B. The mobile phone may display a stored picture and video on the display in response to an operation of tapping an import control 1102 by the user. For example, the mobile phone may display, on the display in response to an operation of tapping the import control 1102 by the user, an interface shown in FIG. 11C. After the user selects a picture 1, a picture 2, a picture 3, and a video 1, the mobile phone displays, on the display in response to an operation of tapping an import control 1103 by the user, an interface shown in FIG. 11D. As shown in FIG. 11D, the user may adjust a position relationship between the picture 1, the picture 2, the picture 3, and the video 1 based on a requirement of the user, and the video with a special effect is obtained in response to an operation of tapping a synthesis control 1106 by the user. The user may preview the synthesized video with a special effect in a video preview frame 1104. Specifically, the mobile phone may play, in response to an operation of tapping an icon 1105 by the user, the video that has a special effect and that is synthesized based on the W image files selected by the user.

Specifically, the mobile phone may synthesize the video with a special effect based on a sequence of the W image files selected by the user. The picture 1, the picture 2, the picture 3, and the video 1 shown in FIG. 11D are used as an example. For example, the video 1 includes Y first video frames. The mobile phone separately uses the picture 1, the picture 2, and the picture 3 as one first video frame, and performs image segmentation on the picture 1, the picture 2, the picture 3, and the first video frames of the video 1, to obtain foreground images and background images of Z first video frames, where Z=Y+3. Then, the mobile phone fuses the foreground images and the background images of different first video frames in the Z first video frames, to obtain the video with a special effect. For a manner in which the mobile phone fuses the foreground images and the background images of different first video frames in the Z first video frames, refer to the manner of fusing the foreground images and the background images of different first video frames in the foregoing example. Details are not described herein again.

It should be noted that, in FIG. 11D, the picture 1 is before the picture 2, the picture 2 is before the picture 3, and the picture 3 is before the video 1. Therefore, the picture 1 may be used as the $1^{st}$ frame of the Z first video frames, the picture 2 is used as the $2^{nd}$ frame of the Z first video frames, the picture 3 may be used as the $3^{rd}$ frame of the Z first video frames, and the $1^{st}$ first video frame of the video 1 is used as the $4^{th}$ frame of the Z first video frames. By analogy, the it first video frame of the video 1 is the $(i+3)^{th}$ frame of the Z first video frames, and the last video frame of the video 1 is the last frame of the Z first video frames.

It should be further noted that when the mobile phone supports two or more image fusion modes, the mobile phone may further display, on an interface displayed on the display in response to an operation of selecting the import control 1103, a control for an image fusion mode supported by the mobile phone. In this way, after selecting a corresponding image fusion mode based on a requirement of the user, the user can synthesize the video with a special effect.

For another example, the W image files may be pictures and/or videos taken at a same place, and/or pictures and/or videos including a same photographed target, and/or pictures and/or videos taken in a same period of time. For example, the W image files are the pictures and/or videos taken at a same place. When the image files taken at a same place are greater than or equal to a first threshold, the mobile phone synthesizes the video with a special effect based on the W image files taken at the same place. The W image files taken at the same place may be all image files that are taken at the place and that are stored in the mobile phone, or may be some of the image files taken at the place. This is not limited herein. For example, the mobile phone may perform image fusion on foreground images and background images of different first video frames based on storage time of the W image files. For example, storage time of an image file 1 is the earliest. If the image file 1 is a picture, the image file 1 is used as the $1^{st}$ first video frame. If the image file 1 is a video, the $1^{st}$ first video frame of the image file 1 is used as the $1^{st}$ first video frame.

Figures 12A, 12B:
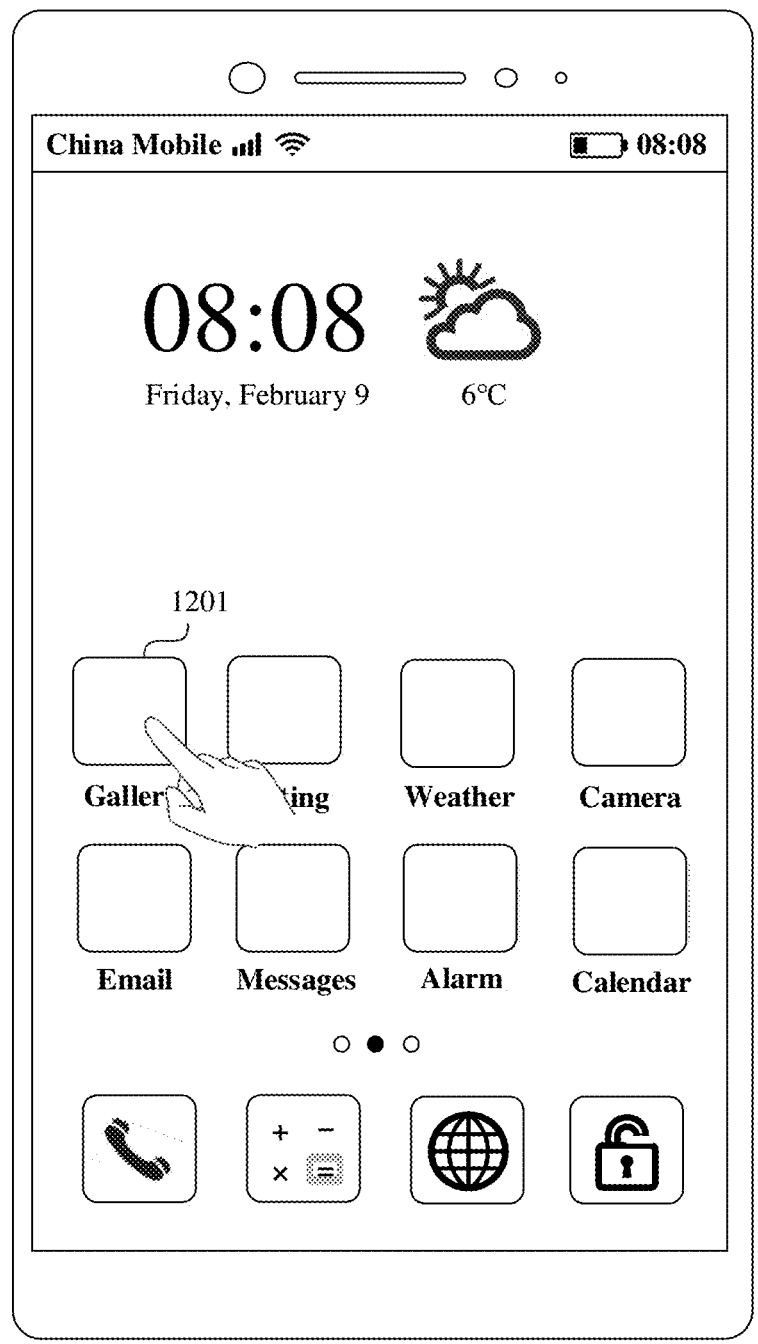
FIG. 12A is a schematic diagram of another user interface according to an embodiment of this application.
FIG. 12B is a schematic diagram of another user interface according to an embodiment of this application.
Figure 12B:
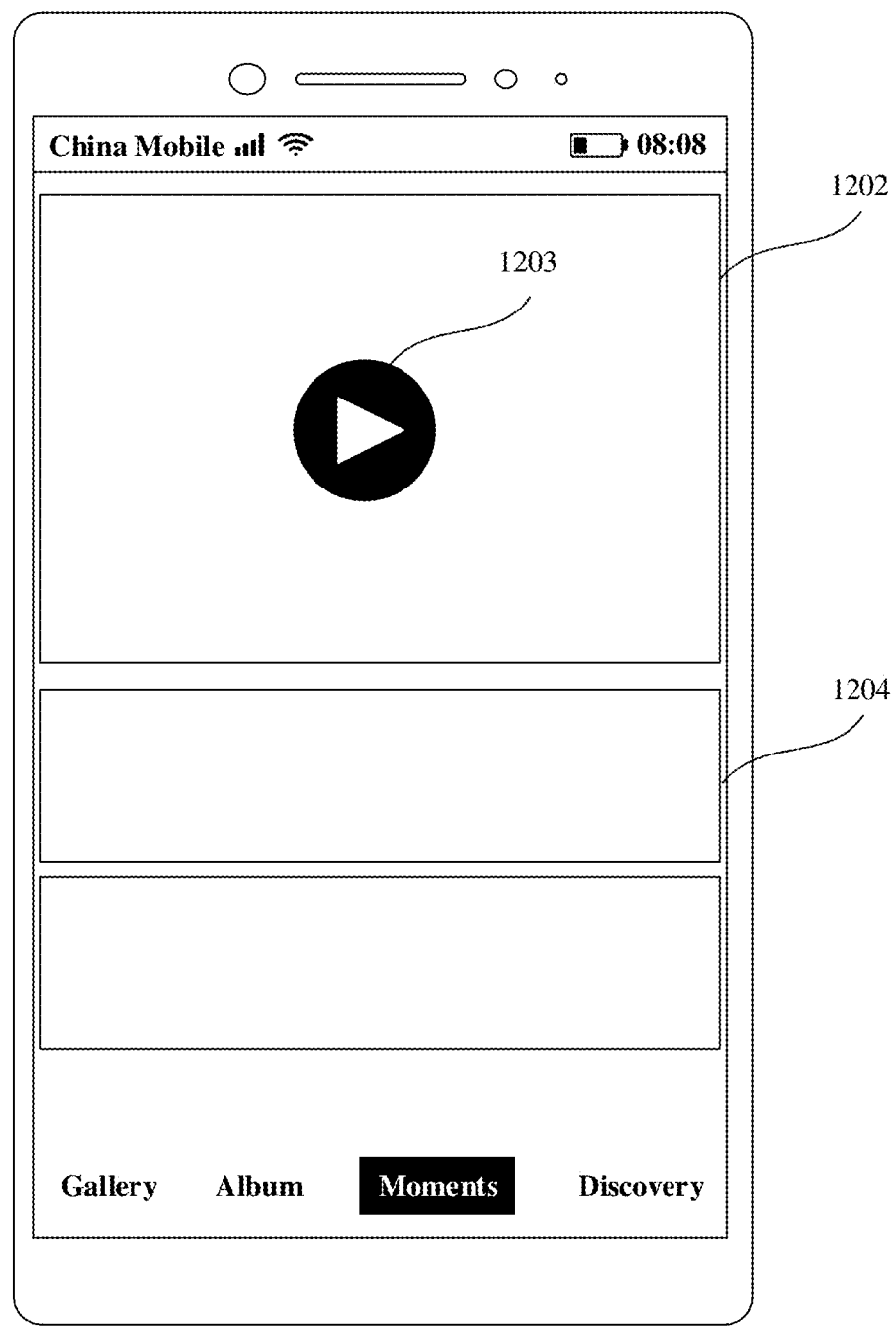

For example, when an interface shown in FIG. 12A is displayed, the mobile phone may display, on the display in response to an operation of tapping a Gallery icon 1201 by the user, an interface shown in FIG. 12B. In response to an operation of tapping a control 1203 by the user, the mobile phone plays a latest synthesized video with a special effect in a video preview frame 1202. For another example, the mobile phone may further play a video 1204 in the video preview frame 1202 in response to an operation of tapping the video 1204 by the user.

Figure 13A:
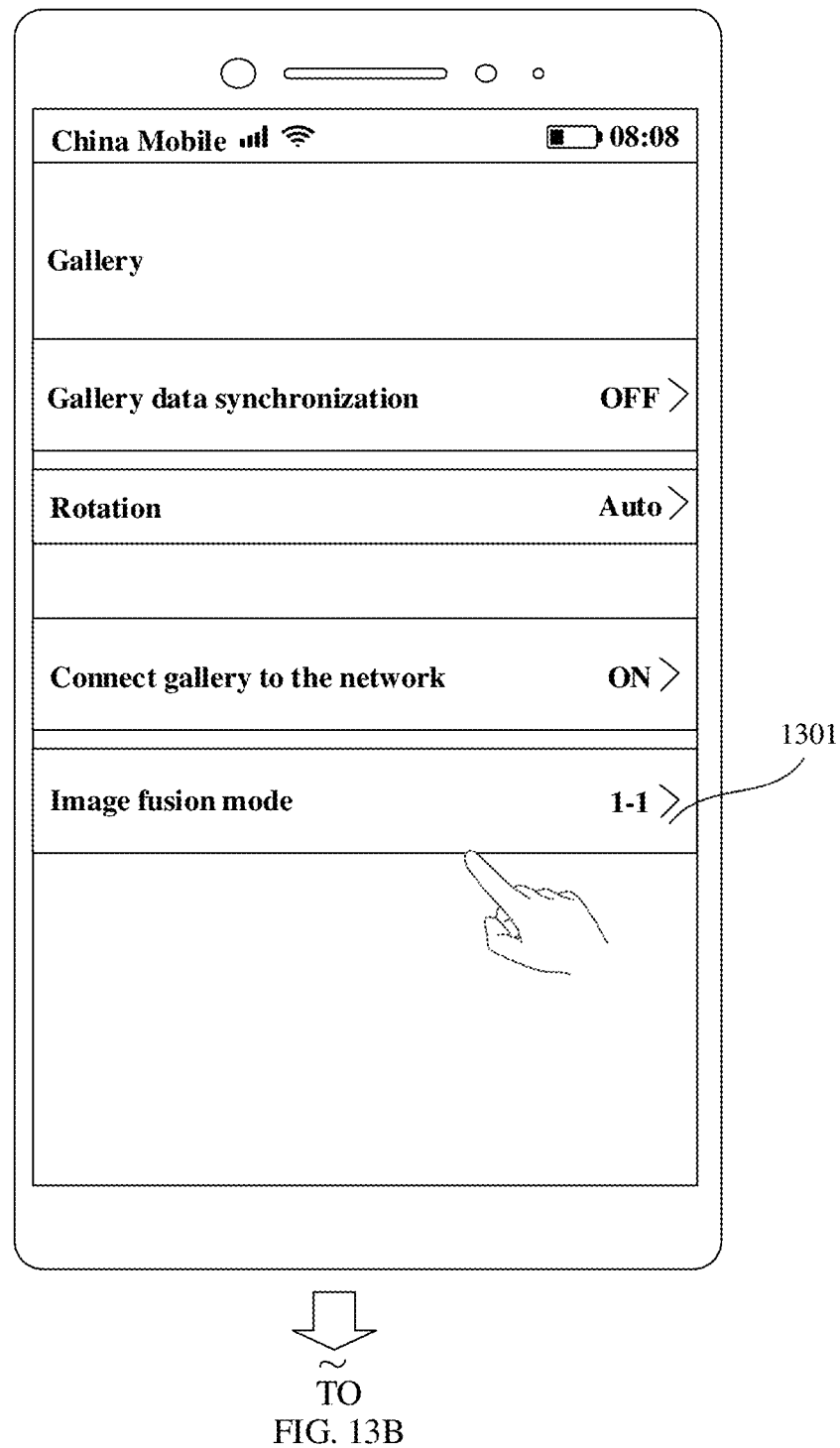
FIG. 13A is a schematic diagram of another user interface according to an embodiment of this application.
Figure 13B:
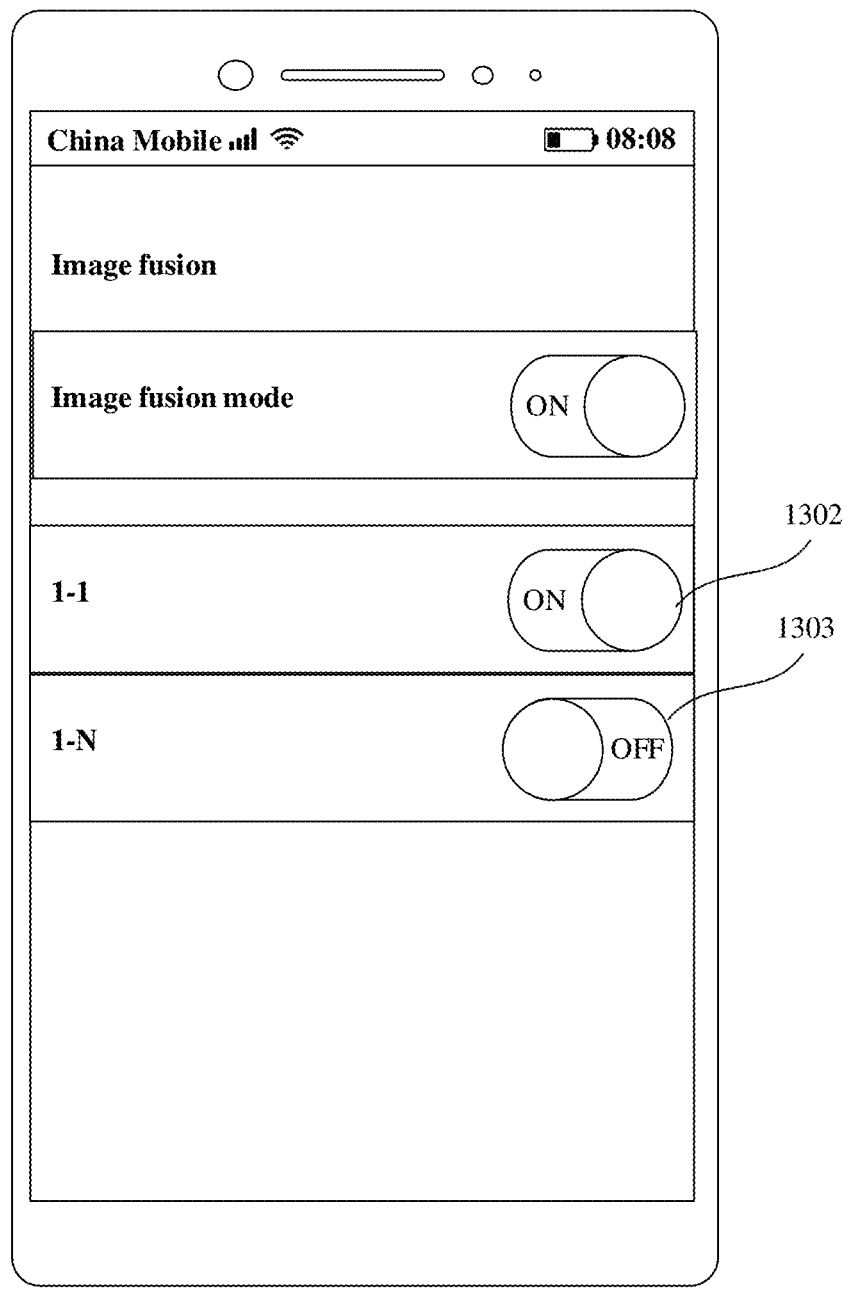
FIG. 13B is a schematic diagram of another user interface according to an embodiment of this application.

It should be noted that when the mobile phone supports two or more image fusion modes, the user may further preset the image fusion mode on a gallery setting interface. For example, the mobile phone supports two image fusion modes. The gallery setting interface may be that shown in FIG. 13A. The mobile phone may display, on the display in response to an operation of tapping an image fusion mode control 1301 by the user, an interface shown in FIG. 13B. After the user enables a control 1302, the mobile phone may fuse background images and foreground images of different first video frames based on an image fusion mode 1-1. For example, for a specific implementation in which the mobile phone fuses the background images and the foreground images of different first video frames based on the image fusion mode 1-1, refer to the image fusion manner in Example 1 or Example 2. Details are not described herein again. For another example, after the user enables a control 1303, the mobile phone may fuse the background images and the foreground images of different first video frames based on an image fusion mode 1-N. For example, for a specific implementation in which the mobile phone fuses the background images and the foreground images of different first video frames based on the image fusion mode 1-N, refer to the image fusion manner in Example 3 or Example 4. Details are not described herein again.

The foregoing embodiments may be used independently, or may be used in combination to achieve different technical effects.

With reference to the foregoing embodiments and the accompanying drawings, an embodiment of this application provides a photographing method. The method may be implemented in an electronic device having the hardware structure shown in FIG. 1.

Figure 14:
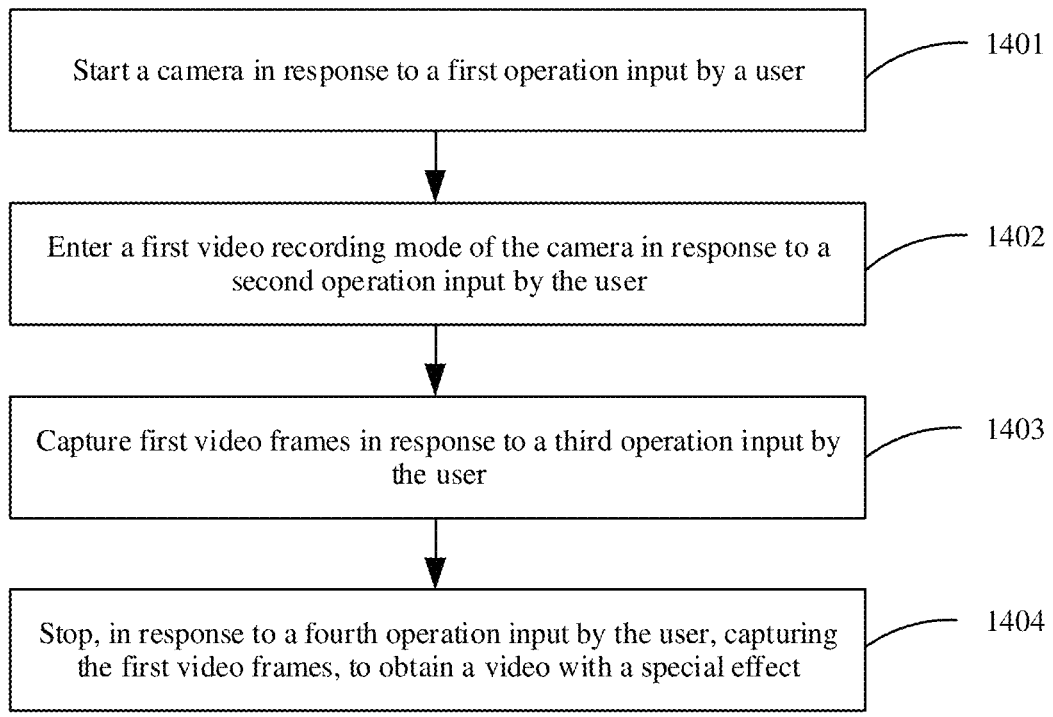
FIG. 14 is a schematic flowchart of a photographing method according to an embodiment of this application.

FIG. 14 is a schematic flowchart of a photographing method according to an embodiment of this application. The following steps are included.

Step 1401: Start a camera in response to a first operation input by a user. For example, the first operation may be an operation of tapping a camera icon, a speech instruction, a shortcut operation, or the like. This is not limited herein.

Step 1402: Enter a first video recording mode of the camera in response to a second operation input by the user.

Step 1403: Capture first video frames in response to a third operation input by the user. That is, video recording starts.

Step 1404: Stop, in response to a fourth operation input by the user, capturing the first video frames, to obtain a video with a special effect. The video with a special effect includes M second video frames. For the video with a special effect, refer to related description of the foregoing embodiments.

In embodiments provided in this application, the method provided in embodiments of this application is described from a perspective in which the electronic device is used as an execution body. To implement functions in the method provided in embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 15:
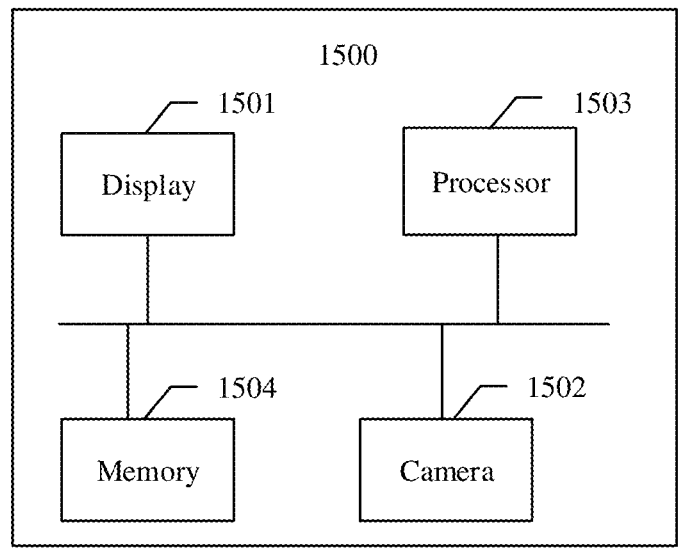
FIG. 15 is a schematic diagram of a structure of an electronic device according to an embodiment of this application.

As shown in FIG. 15, an embodiment of this application discloses an electronic device 1500. The electronic device 1000 may include a display 1501, a camera 1502, one or more processors 1503, a memory 1504, a plurality of applications 1505, and one or more computer programs 1506. The foregoing components may be connected through one or more communications buses 1507. The one or more computer programs 1506 are stored in the memory 1504 and configured to be executed by the one or more processors 1503, to implement the photographing method shown in FIG. 14 in embodiments of this application.

The processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and the logical block diagrams that are disclosed in embodiments of this application. The general-purpose processor may be a microprocessor, or the processor may be any conventional processor or the like. The steps of the method disclosed with reference to embodiments of this application may be directly presented as being performed and completed by a hardware decoding processor, or performed and completed by a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing method in combination with hardware of the processor.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) or a processor to perform all or some of the steps of the method described in embodiments of this application. The foregoing storage medium includes any medium that can store program code, such as a USB flash drive, a removable hard disk, a ROM, a RAM, a magnetic disk, or an optical disc.

The foregoing description is merely non-limiting examples of implementations and is not intended to limit the protection scope of this application, which is intended to cover any variation or replacement readily determined by a person skilled in the art. Therefore, the claims shall define the protection scope.

What is claimed is:

1. A photographing method, performed by an electronic device having a display and a camera, wherein the method comprises:

starting the camera in response to a first operation input by a user;

entering a first video recording mode of the camera in response to a second operation input by the user;

capturing, by the camera in response to a third operation input by the user, first video frames; and stopping, by the camera in response to a fourth operation input by the user, capturing the first video frames, to obtain a target video, wherein the target video comprises M second video frames; an $i^{th}$ second video frame in the M second video frames is obtained by fusing a foreground image of a $k^{th}$ first video frame in the first video frames captured by the camera and a background image of a $j^{th}$ first video frame in the first video frames captured by the camera; an $(i+1)^{th}$ second video frame in the M second video frames is obtained by fusing a foreground image of a $(k+m)^{th}$ first video frame in the first video frames captured by the camera and a background image of a $(j+n)^{th}$ first video frame in the first video frames captured by the camera; and M>1, m≥1, n≥1, m≠n, and i, j, k, m, n, and M are positive integers.

2. The method according to claim 1, further comprising:
displaying a dialog box on the display in response to the second operation input by the user, wherein the dialog box prompts the user to select a photographed target from the first video frames captured by the camera, and the photographed target is an object presented in a foreground image of one of the first video frames.

3. The method according to claim 1, wherein the camera is a dual-camera or a time of flight (TOF) camera.

4. The method according to claim 1, further comprising performing image segmentation on each video frame of the first video frames to obtain a foreground image and a background image of the video frame.

5. The method according to claim 1, wherein the first video recording mode of the camera is a special-effect video recording mode or a time-lapse photographing mode.

6. The method according to claim 1, wherein the target video is obtained using pixel values of at least some of pixels within a foreground image in at least one video frame of the first video frames, and each of pixel values of pixels within at least a portion of a foreground image in each of the first video frames is multiplied by a weight value.

7. The method according to claim 6, wherein the weight value is larger than or equal to 0.5 and less than and equal to 1.

8. The method according to claim 6, wherein a pixel value of a pixel closer to a boundary of the foreground image is multiplied by a weight value smaller than that applied to pixels farther from the boundary of the foreground image.

9. An electronic device, comprising a display, one or more processors, a camera, and a memory storing one or more computer programs that, when executed by the one or more processors, enable the electronic device to perform operations comprising:

starting the camera in response to a first operation input by a user;

entering a first video recording mode of the camera in response to a second operation input by the user;

capturing, by the camera in response to a third operation input by the user, first video frames; and stopping, by the camera in response to a fourth operation input by the user, capturing the first video frames, to obtain a target video, wherein the target video comprises M second video frames; an $i^{th}$ second video frame in the M second video frames is obtained by fusing a foreground image of a $k^{th}$ first video frame in the first video frames captured by the camera and a background image of a $j^{th}$ first video frame in the first video frames captured by the camera; an $(i+1)^{th}$ second video frame in the M second video frames is obtained by fusing a foreground image of a $(k+m)^{th}$ first video frame in the first video frames captured by the camera and a background image of a $(j+n)^{th}$ first video frame in the first video frames captured by the camera; and M>1, m≥1, n≥1, m≠n, and i, j, k, m, n, and M are positive integers.

10. The electronic device according to claim 9, wherein, when the computer programs are executed by the one or more processors, the electronic device is further enabled to perform operations comprising:

displaying a dialog box on the display in response to the second operation input by the user, wherein the dialog box prompts the user to select a photographed target from the first video frames captured by the camera, and the photographed target is an object presented in a foreground image of one of the first video frames.

11. The electronic device according to claim 9, wherein the camera is a dual-camera or a time of flight (TOF) camera.

12. An electronic device, comprising a display, one or more processors, a camera, and a memory storing one or more computer programs that, when executed by the one or more processors, enable the electronic device to perform operations comprising:

starting the camera in response to a first operation input by a user;

entering a first video recording mode of the camera in response to a second operation input by the user;

capturing, by the camera in response to a third operation input by the user, first video frames; and stopping, by the camera in response to a fourth operation input by the user, capturing the first video frames, to obtain a target video, wherein the target video comprises M second video frames; a background image of an $i^{th}$ second video frame in the M second video frames is obtained by superimposing background images of an $i^{th}$ first video frame captured by the camera and r first video frames before the $i^{th}$ first video frame;

a foreground image of the $i^{th}$ second video frame is a foreground image of the $i^{th}$ first video frame captured by the camera; and i>1, and i and r are positive integers.

13. The electronic device according to claim 12, wherein a background image of an $(i+1)^{th}$ second video frame in the M second video frames is obtained by superimposing background images of an (i+1)th first video frame captured by the camera and t first video frames before the (i+1)th first video frame; a foreground image of the (i+1)th second video frame is a foreground image of the (i+1)th first video frame captured by the camera; and t/r, and t is a positive integer.

14. The electronic device according to claim 12, wherein when the computer programs are executed by the one or more processors, the electronic device is further enabled to perform operations comprising:

displaying the $i^{th}$ second video frame on the display when the camera captures the $i^{th}$ first video frame.

15. The electronic device according to claim 12, wherein, when the computer programs are executed by the one or more processors, the electronic device is further enabled to perform operations comprising:

displaying a dialog box on the display in response to the second operation input by the user, wherein the dialog box prompts the user to select a photographed target from the first video frames captured by the camera, and the photographed target is an object presented in a foreground image of one of the first video frames.

16. The electronic device according to claim 12, wherein the camera is a dual-camera or a time of flight (TOF) camera.

* * * * *

UNITED STATES PATENT AND TRADEMARK OFFICE
CERTIFICATE OF CORRECTION

PATENT NO. : 12,120,450 B2
APPLICATION NO. : 17/780586
DATED : October 15, 2024
INVENTOR(S) : Bin Xiao It is certified that error appears in the above-identified patent and that said Letters Patent is hereby corrected as shown below:

In the Specification

Column 14, Line 12, change "Aplurality" to --A plurality--.

Signed and Sealed this
Twelfth Day of November, 2024

Katherine Kelly Vidal
Director of the United States Patent and Trademark Office